United States Patent
Yang et al.

(10) Patent No.: US 11,696,186 B2
(45) Date of Patent: Jul. 4, 2023

(54) PERIODIC RESOURCE RESERVATION FOR SERVING APERIODIC TRAFFIC OVER SIDELINK

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US); Wanshi Chen, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/314,964

(22) Filed: May 7, 2021

(65) Prior Publication Data

US 2021/0385696 A1    Dec. 9, 2021

Related U.S. Application Data

(60) Provisional application No. 63/036,823, filed on Jun. 9, 2020.

(51) Int. Cl.
*H04W 28/26* (2009.01)
*H04W 72/04* (2023.01)
(Continued)

(52) U.S. Cl.
CPC ........... *H04W 28/26* (2013.01); *H04L 1/1812* (2013.01); *H04W 24/08* (2013.01); *H04W 72/20* (2023.01); *H04W 72/0446* (2013.01)

(58) Field of Classification Search
CPC ..... H04L 47/10; H04L 43/50; H04L 12/2697; H04L 43/0852; H04L 43/00;
(Continued)

(56) References Cited

U.S. PATENT DOCUMENTS

| 2020/0029318 A1* | 1/2020 | Guo | H04W 72/042 |
| 2020/0029340 A1* | 1/2020 | He | H04W 72/10 |

(Continued)

FOREIGN PATENT DOCUMENTS

| KR | WO 2021/060936 A1 * | 4/2021 | ............ H04W 72/02 |
| SE | WO 2019/192701 A1 * | 10/2019 | ............ H04W 76/14 |

OTHER PUBLICATIONS

3GPP TSG RAN WG1 #97, Reno, USA, May 13-17, 2019, R1-1906074, Source: Nokia, Nokia Shanghai Bell, Title: Discussion of physical layer structure for sidelink, Agenda item: 7.2.4.1. (Year: 2019).*

(Continued)

*Primary Examiner* — Peter G Solinsky
*Assistant Examiner* — Sanjay K Dewan
(74) *Attorney, Agent, or Firm* — Procopio, Cory, Hargreaves & Savitch LLP

(57) ABSTRACT

Aspects presented herein may enable a wireless device to use periodic reserved resources to serve aperiodic traffic over sidelink. In one aspect, a wireless device reserves a set of periodic resources for sidelink transmission, where the reserved set of periodic resources include reserved resources for SCI and reserved resources for data. The wireless device transmits SCI without a data transmission in a periodic resource for the period. In another aspect, a first wireless device receives a reservation from a second wireless device for a set of periodic resources for sidelink transmission. The first wireless device receives, from the second wireless device, SCI in a period of the periodic resources, the SCI (Continued)

including an indication that the SCI is not associated with a data transmission.

29 Claims, 16 Drawing Sheets

(51) Int. Cl.
- *H04W 24/08* (2009.01)
- *H04L 1/18* (2023.01)
- *H04L 1/1812* (2023.01)
- *H04W 72/20* (2023.01)
- *H04W 72/0446* (2023.01)

(58) Field of Classification Search
CPC .... H04L 1/1812; H04W 28/26; H04W 24/08; H04W 72/0406; H04W 72/0446
USPC ........................................................ 370/252
See application file for complete search history.

(56) References Cited

U.S. PATENT DOCUMENTS

| | | | |
|---|---|---|---|
| 2020/0288486 A1* | 9/2020 | Kwak | H04W 72/0406 |
| 2020/0344722 A1* | 10/2020 | He | H04W 72/0446 |
| 2020/0367221 A1* | 11/2020 | Maaref | H04W 72/085 |
| 2022/0141837 A1* | 5/2022 | Jiang | H04W 4/40 370/252 |

OTHER PUBLICATIONS

3GPP TSG RAN WG1 #98, Prague, CZ, Aug. 26-30, 2019, R1-1908282, Source: Nokia, Nokia Shanghai Bell, Title: Discussion of Physical layer structure for sidelink, Agenda item: 7.2.4.1. (Year: 2019).*

International Search Report and Written Opinion—PCT/US2021/031602—ISA/EPO—dated Sep. 15, 2021.

Nokia, et al., "Discussion of Physical Layer Structure for Sidelink", 3GPP Draft, 3GPP TSG RAN WG1 #97, R1-1906074, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051727531, 18 pages, Retrieved from the Internet: URL: http://www.3gpp.org/ftp/Meetings%5F3GPP%5FSYNC/RAN1/Docs/R1%2D1906074%2Ezip [retrieved on May 13, 2019] figures 1-10, sections 1-3.

Nokia, et al., "Discussion of Physical Layer Structure for Sidelink", 3GPP Draft, 3GPP TSG RAN WG1 #98, R1-1908282, 3rd Generation Partnership Project (3GPP), Mobile Competence Centre, 650, Route Des Lucioles, F-06921, Sophia-Antipolis Cedex, France, vol. No. Prague, CZ, Aug. 26, 2019-Aug. 30, 2019, Aug. 17, 2019 (Aug. 17, 2019), XP051764895, 19 pages, Retrieved from the Internet: URL:http://www.3gpp.org/ftp/tsg_ran/WG1_RL1/TSGR1_98/Docs/R1-1908282.zip [retrieved on Aug. 17, 2019] figures 1-7 sections 1-3.

* cited by examiner

PERIODIC RESOURCE RESERVATION FOR SERVING APERIODIC TRAFFIC OVER SIDELINK

CROSS REFERENCE TO RELATED APPLICATION(S)

This application claims the benefit of U.S. Provisional Application Ser. No. 63/036,823, entitled "PERIODIC RESOURCE RESERVATION FOR SERVING APERIODIC TRAFFIC OVER SIDELINK" and filed on Jun. 9, 2020, which is expressly incorporated by reference herein in its entirety.

BACKGROUND

Technical Field

The present disclosure relates generally to communication systems, and more particularly, to wireless communication based on sidelink.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as based on sidelink. There exists a need for further improvements in sidelink communication technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a wireless device. The apparatus reserves a set of periodic resources for sidelink transmission, where the reserved set of periodic resources include reserved resources for sidelink control information (SCI) and reserved resources for data. The apparatus transmits SCI without a data transmission in a periodic resource for a period.

In an aspect of the disclosure, a method, a computer-readable medium, and an apparatus are provided for wireless communication at a first wireless device. The apparatus receives a reservation from a second wireless device for a set of periodic resources for sidelink transmission. The apparatus receives, from the second wireless device, SCI in a period of the periodic resources, the SCI including an indication that the SCI is not associated with a data transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
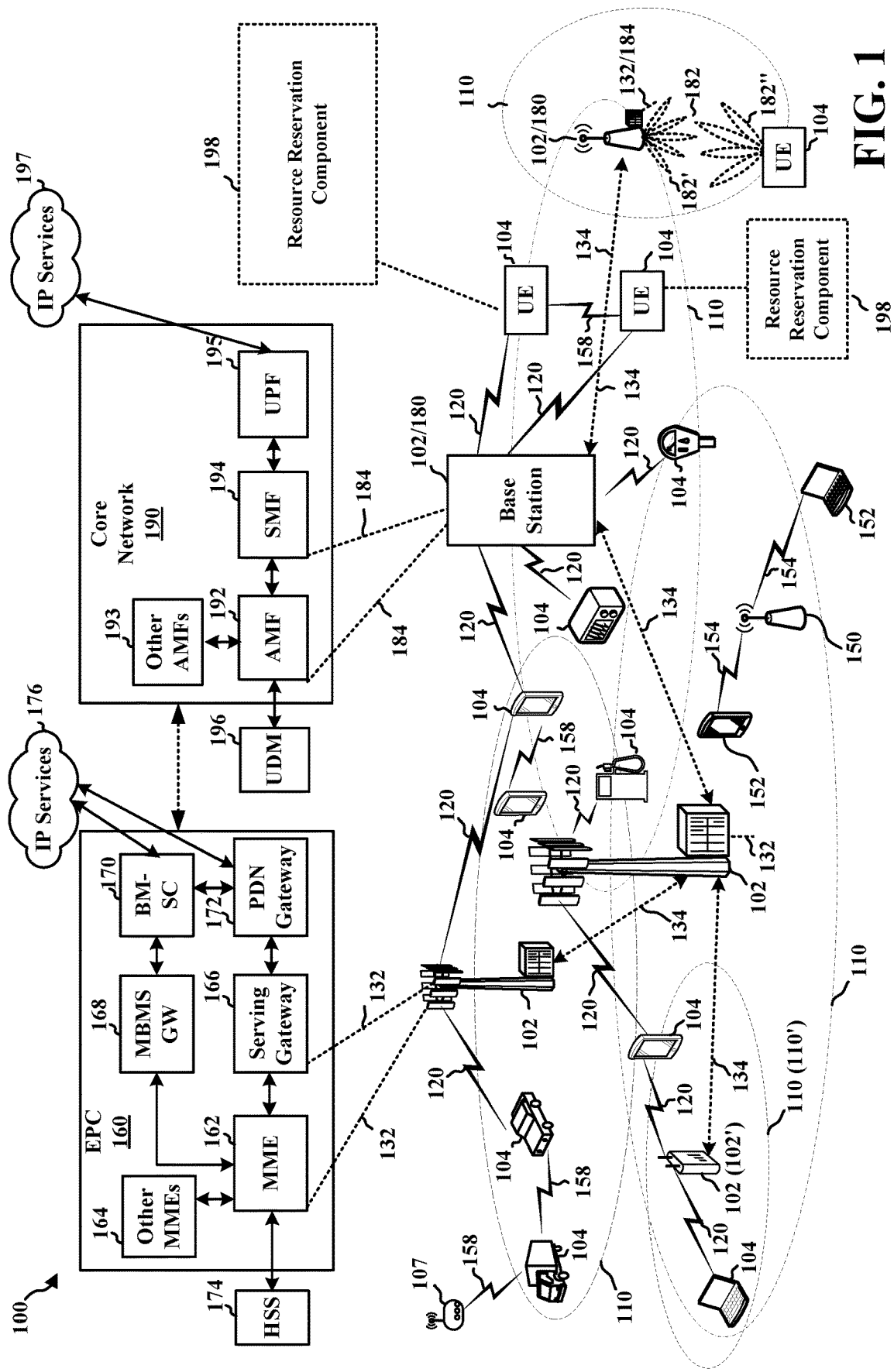
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may provide a periodic resource allocation mechanism that enables periodically reserved resources to be used for aperiodic traffic. The aspects presented herein may enable a UE to reserve periodic resources based on a sensing or partial sensing technique while also providing support for aperiodic traffic. When a UE elects not to use a reserved resource in a transmission period, the UE may be configured to refrain from transmitting any data in that transmission period, thereby enabling the UE to adapt the resource reservation based on an instantaneous traffic load. Thus, a sidelink resource may be reserved by UEs in a periodic fashion while still providing flexibility for aperiodic traffic.

In certain aspects, the UE 104 may include a resource reservation component 198 configured to reserve resources on a sidelink. The resource reservation component 198 may enable a UE to make resource reservation on a sidelink and to refrain transmitting any data in the reserved resources when the UE determines there is no data to be transmitted in a transmission window. The resource reservation component 198 may optionally enable the UE to release the reserved resources after the UE stops to transmit data for a consecutive period. In one configuration, the resource reservation component 198 may be configured to reserve a set of periodic resources for sidelink transmission, where the reserved set of periodic resources include reserved resources for SCI and reserved resources for data. In such configuration, the resource reservation component 198 may transmit the SCI without a data transmission in a periodic resource for a period. In another configuration, the resource reservation component 198 may be configured to receive a reservation from a second wireless device for a set of periodic resources for sidelink transmission. In such configuration, the resource reservation component 198 may receive, from the second wireless device, SCI in a period of the periodic resources, the SCI including an indication that the SCI is not associated with a data transmission.

Some examples of sidelink communication may include vehicle-based communication such as vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as V2X communications. As an example, in FIG. 1, a UE 104, e.g., a transmitting Vehicle User Equipment (VUE) or other UE 104, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
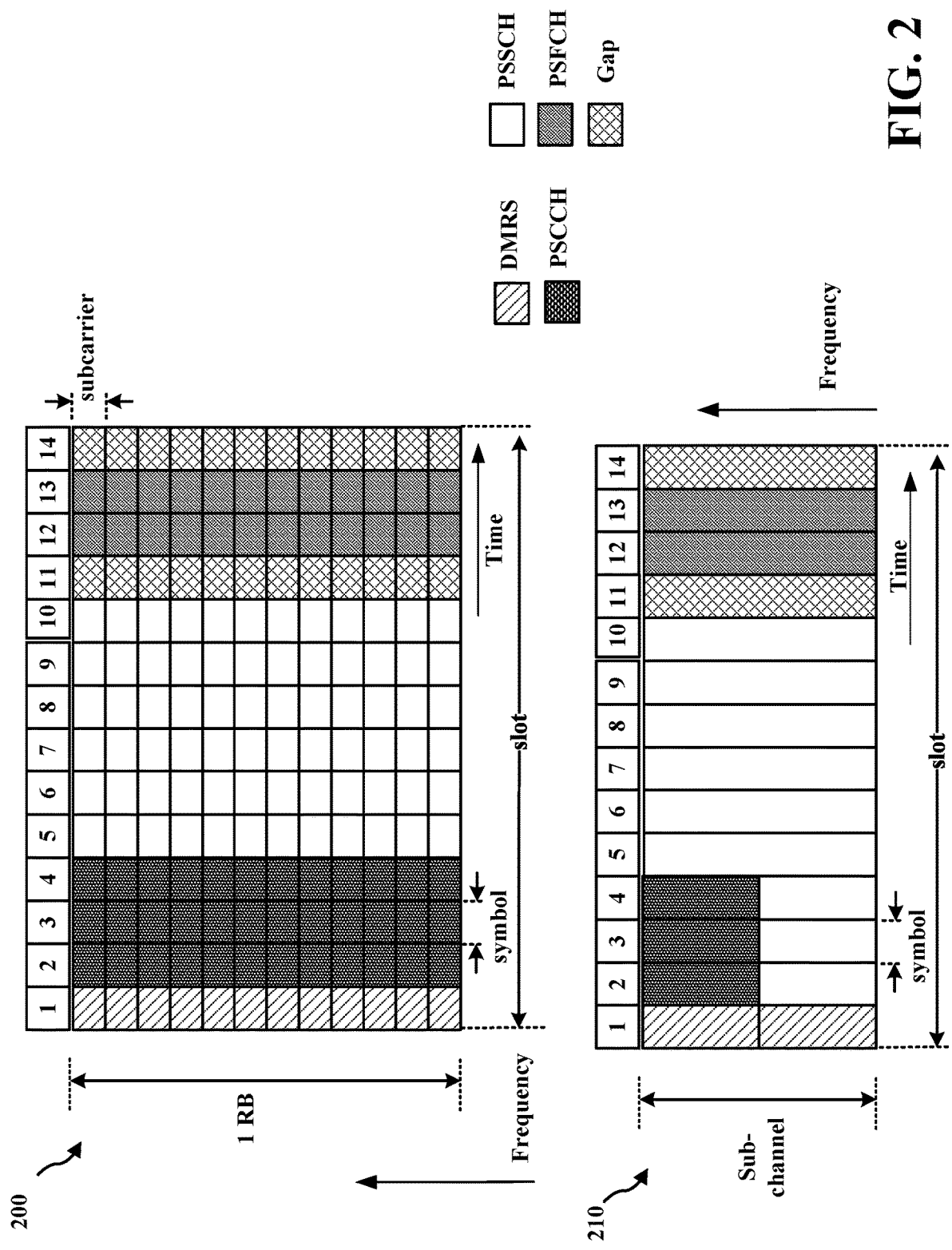
FIG. 2 illustrates example aspects of a sidelink slot structure.

FIG. 2 illustrates example diagrams 200 and 210 illustrating non-limiting aspects of slot structures that may be used for sidelink communication. The slot structure may be within a 5G/NR frame structure in some examples. In other examples, the slot structure may be within an LTE frame structure or a frame structure. Aspects may also be applied within a slot structure of a different radio access technology.

Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback gap symbols, and/or LBT symbols may be different than the example illustrated in FIG. 2. Multiple slots may be aggregated together in some aspects.

Figure 3:
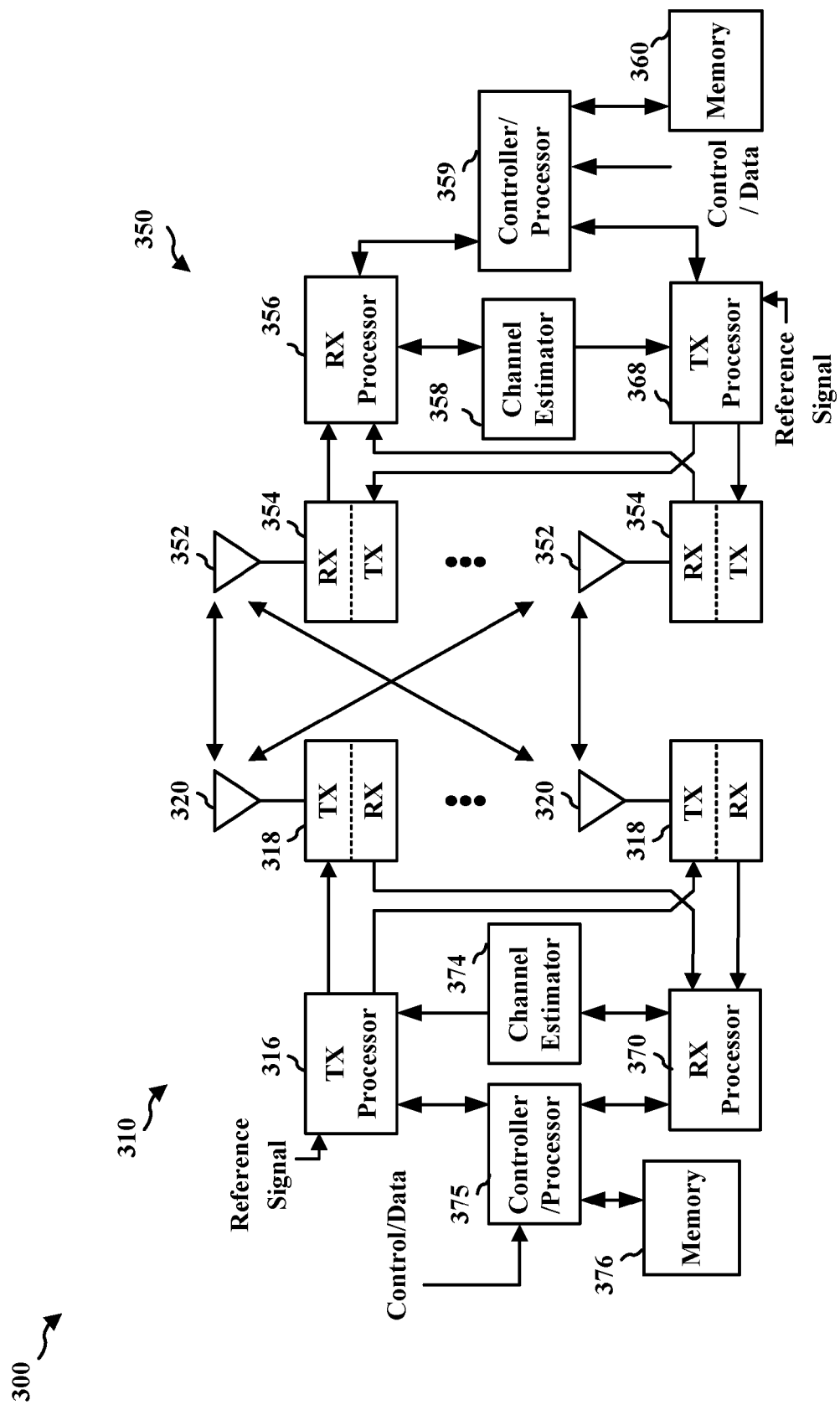
FIG. 3 is a diagram illustrating an example of a first device and a second device involved in sidelink wireless communication based.

FIG. 3 is a block diagram 300 of a first wireless communication device 310 in communication with a second wireless communication device 350. The communication may be based on sidelink, e.g., using a PC5 interface. In some examples, the devices 310 and 350 may communicate based on V2X or other D2D communication. The devices 310 and the 350 may comprise a UE, an RSU, a base station, etc. In some examples, the device 310 may be a UE and the device 350 may be a UE. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with resource reservation component 198 of FIG. 1.

Figure 4:
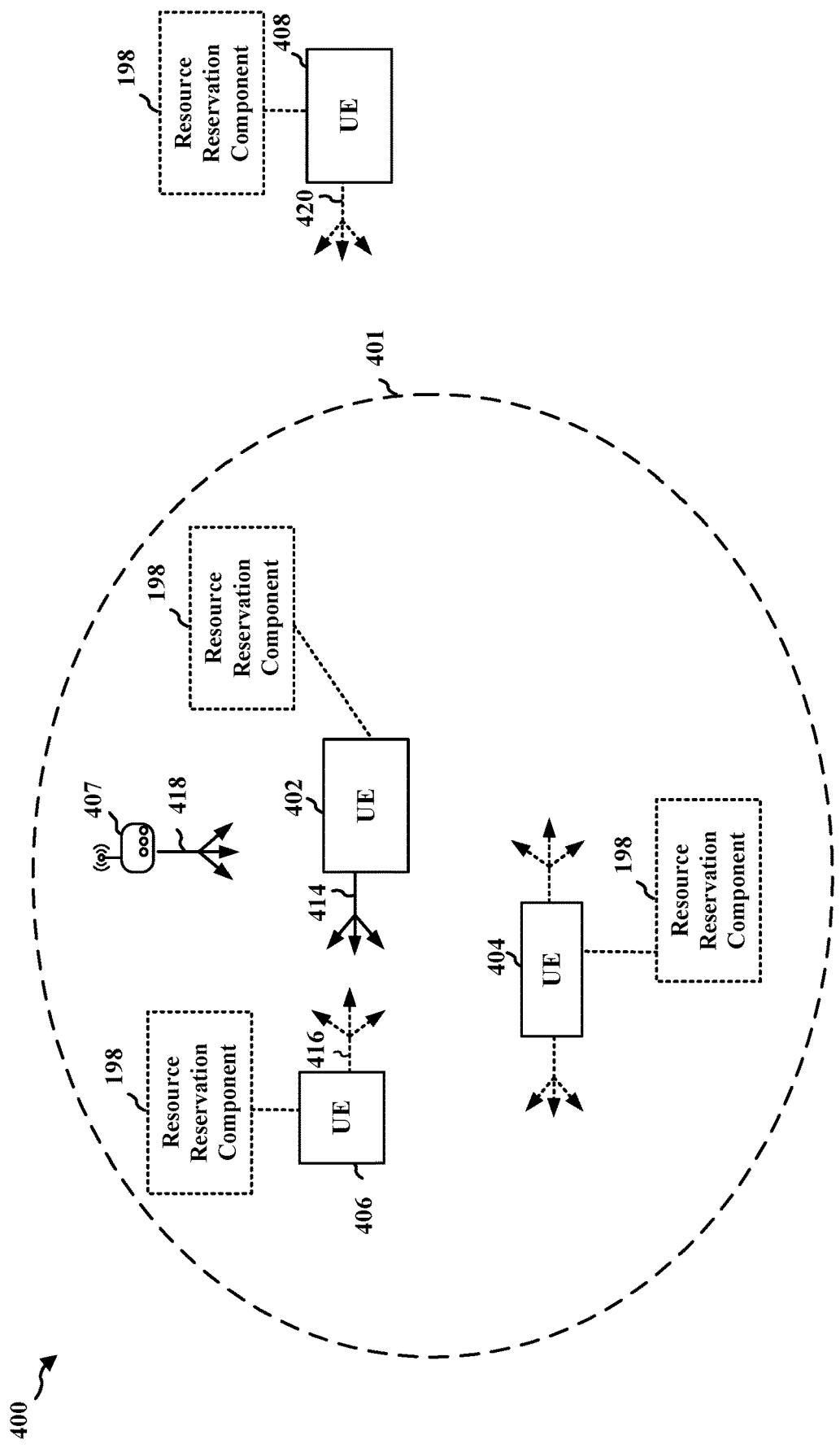
FIG. 4 is a diagram illustrating an example of sidelink communication.

FIG. 4 is a diagram 400 illustrating an example of sidelink communication between wireless devices. The communication may be based on a slot structure including aspects described in connection with FIG. 2 or another sidelink structure. Although the example in FIG. 4 is described for the UEs 402, 404, 406, 408, aspects may be applied to other wireless devices configured for communication based on sidelink, such as an RSU, an IAB node, etc. As illustrated in FIG. 4, a transmitting UE 402 may transmit a transmission 414 including a control information (e.g., sidelink control information (SCI)) and/or a corresponding data channel, that may be received by receiving UEs 404, 406, 408. The SCI may include information for decoding the corresponding data and may also be used by receiving device to avoid interference by refraining from transmitting on the occupied resources during a data transmission. For example, the SCI may reserve resources for sidelink communication. The number of TTIs, as well as the RBs that will be occupied by the data transmission, may be indicated in SCI from the transmitting device. The UEs 402, 404, 406, 408 may each be capable of operating as a transmitting device in addition to operating as a receiving device. Thus, the UEs 406, 408 are illustrated as transmitting transmissions 416 and 420. The transmissions 414, 416 or 420 may be broadcast or multicast to nearby devices. For example, the UE 402 may transmit communication intended for receipt by other UEs within a range 401 of the UE 402. In other examples, the transmissions 414, 416, or 420 may be groupcast to nearby devices that are a member of a group. In other examples, the transmissions 414, 416, or 420 may be unicast from one UE to another UE. Additionally, or alternatively, the RSU 407 may receive communication from and/or transmit communication 418 to the UEs 402, 404, 406, 408.

Resource allocation may refer to how a resource (e.g., time and/or frequency resource) is allocated to a transmitting device for transmitting a packet. In sidelink communication, resource allocation may be performed in a centralized manner (which may be referred to herein as "Mode 1") or in a distributed manner (which may be referred to herein as "Mode 2"). When operating using Mode 1, resource allocations for sidelink communication may be determined by a network entity, such as a base station. For example, the base station may transmit an indication to a UE that indicate s the resources that are allocated to the UE to use to transmit sidelink communication, e.g., for transmitting sidelink data packets to other UEs. When operating using Mode 2, the resource allocations for sidelink communication are determined by the communicating UE, e.g., with each UE autonomously determine resources to use for sidelink transmission. For example, a transmitting UE may autonomously determine resource allocations for transmitting sidelink control and data to one or more receiving UE. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that include s reservation information based on a resource reservation field comprised in the SCI. The UE may continuously monitor for (e.g., sense) and decode SCI from peer UEs. The SCI may include reservation information, e.g., indicating slots and RB s that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
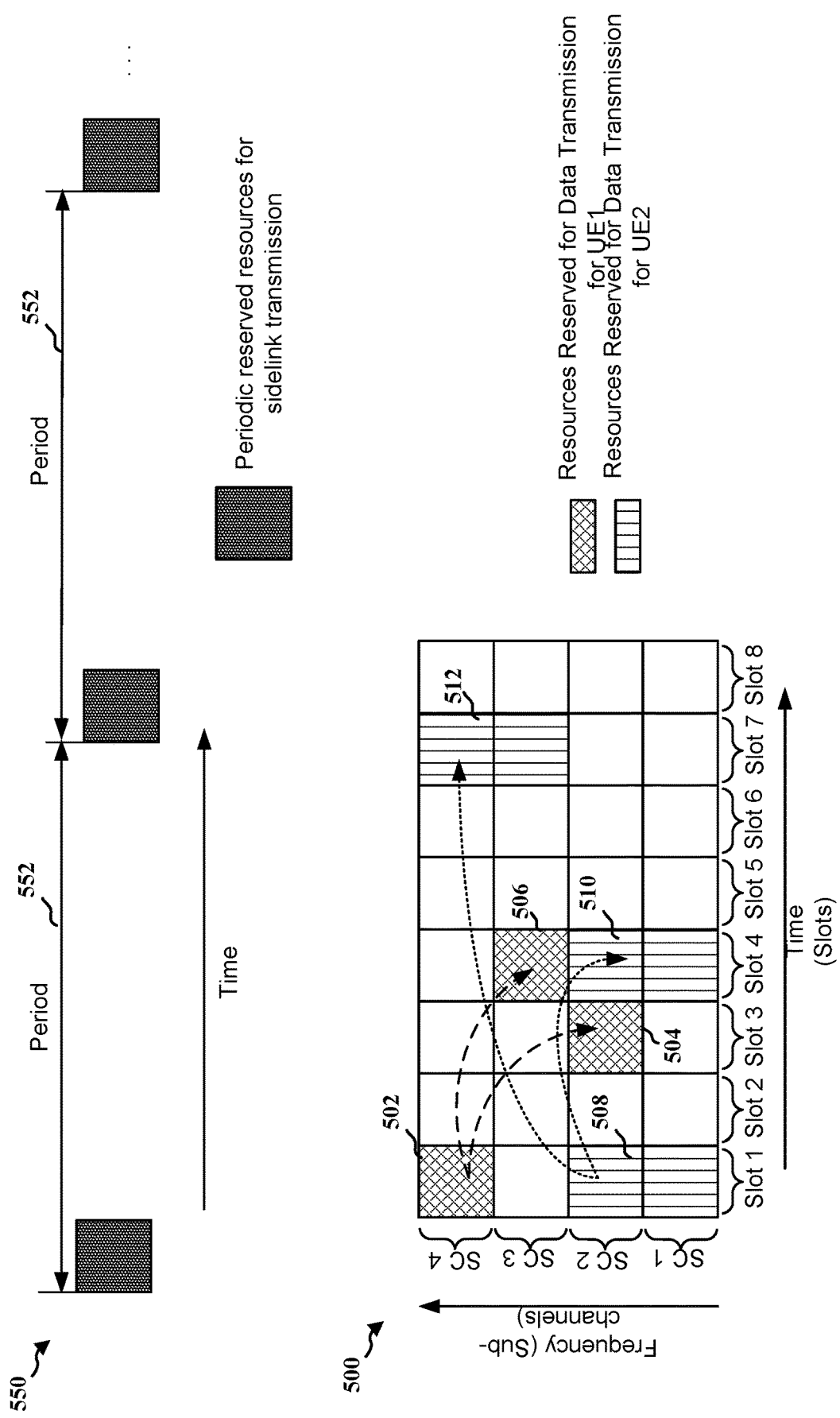
FIG. 5 is a diagram illustrating an example resource reservation.

When operating using Mode 2 (e.g., in a distributed manner), the transmitting UE may determine the resources to use for communicating from a resource pool. A resource pool may refer to a collection of time and/or frequency resources on which sidelink communication may occur. FIG. 5 illustrates an example of time and frequency resources that may be available for sidelink communication. A resource pool may be either preconfigured (e.g., preloaded on a UE), configured by a base station, or otherwise determined by the UE. In some examples, a transmitting UE may randomly select resources from a resource pool for a transmission. In such examples, receiving UEs may continuously monitor candidate resources to receive a communication, e.g., SCI indicating a resource reservation. In some examples, if a nearby UE randomly selects the same resource, a collision or interference may occur.

In some examples, a UE may use historical resource utilization of other UEs to predict future activity. For example, by identifying that a first UE transmits periodically and what resources the first UE uses when transmitting, a second UE may determine on which resources future transmissions by the first UE may occur and also when they may occur. FIG. 5 illustrates an example of period resources 550 that may be reserved by a UE for sidelink communication. Thus, by "listening" to other UE activity in the past (e.g., historical resource utilization), the second UE may predict future activity of the other UEs and can select a resource to use for a transmission that is less likely to result in a collision and/or interference.

However, it may be appreciated that for the second UE to identify historical resource utilization, the second UE may operate in an "always-on" mode to facilitate sensing or receiving of transmission by the other UEs. The continual monitoring by the second UE increases power consumption or processing resources in order to identify historical resource utilization and to predict future activity.

In some examples, a UE may perform partial sensing for determining historical resource utilization of other UEs. When performing partial sensing, the UE may selectively sense a subset of resources and, thus, may reduce power consumption in comparison to monitoring the set of resources. However, partial sensing may not be effective when transmissions by other UEs are not periodic. For example, a UE employing partial sensing may miss information about aperiodic transmissions and, thus, may be unable to accurately predict future activity of the other UEs based on a determined historical resource utilisation.

The radio resource allocation for a sidelink communication may be based on resource reservations. For instance, when a UE is preparing to transmit data on a sidelink, the UE may first determine whether resources are reserved by other UEs. Then, the UE may reserve resources from the remaining unreserved resources that are available. FIG. 5 is a diagram 500 illustrating an example of resources reservations for sidelink transmissions. The resource allocation for each UE may be in units of one or more sub-channels in the frequency domain (e.g., sub-channels SC 1 to SC 4), and may be based on one slot in the time domain. The UE may also use resources in the current slot to perform an initial transmission, and may reserve resources in future slots for retransmissions. In this example, up to two different future slots may be reserved by the UEs (e.g., UE1 and UE2) for retransmissions. The resource reservation may be limited to a window of pre-defined slots and sub-channels. For example, as shown by diagram 500 in FIG. 5, the resource reservation may include an eight (8) time slots by four (4) sub-channels window, which may provide a total number of thirty-two (32) available resource blocks. This window for resource reservation may also be referred to as a resource selection window. Each resource block in the resource selection window may be used by a transmitting device for transmitting both data and control information.

In one example, a first UE ("UE1") may reserve a sub-channel (e.g., SC 4) in a current slot (e.g., slot 1) for its initial data transmission, and may reserve additional future slots within the window for data retransmissions (e.g., 504 and 506). For example, UE1 may reserve sub-channels SC 2 at slots 3 and SC 3 at slot 4 for future retransmissions as shown by FIG. 5. UE1 may then transmit information regarding which resources are being used and/or reserved by it to other UE(s), such as by including the reservation information in the reservation resource field of the SCI, e.g., a first stage SCI. The UE may be configured to use the SCI to reserve one, two or three transmissions. A maximum number of reservation allowed for a UE may be preconfigured for the UE. For example, a UE may be reserve up to three transmissions within a resource selection window.

As illustrated by FIG. 5, a second UE ("UE2") may also reserve resources in sub-channels SC 1 and SC 2 at time slot 1 for its current data transmission, and may reserve a first data retransmission at time slot 4 using sub-channels SC 1 and SC 2, and reserve a second data retransmission at time slot 7 using sub-channels SC 3 and SC 4 as shown by FIG. 5. Similarly, UE2 may then transmit the resource usage and reservation information to other UE(s), such as using the reservation resource field in SCI. The UE may also be configured to make all the reservations with same number of sub-channels (e.g., bandwidth). For example, resources 502, 504 and 506 reserved by UE1 may have same number of sub-channels (e.g., 1), and resources 508, 510 and 512 reserved by UE2 may have same number of sub-channels (e.g., 2) as well. However, the starting sub-channel for each reserved resource may be different. For example, resource 502 may start at SC 4, resource 504 may start at SC 2, and resource 506 may start at SC3, etc.

Figure 6:
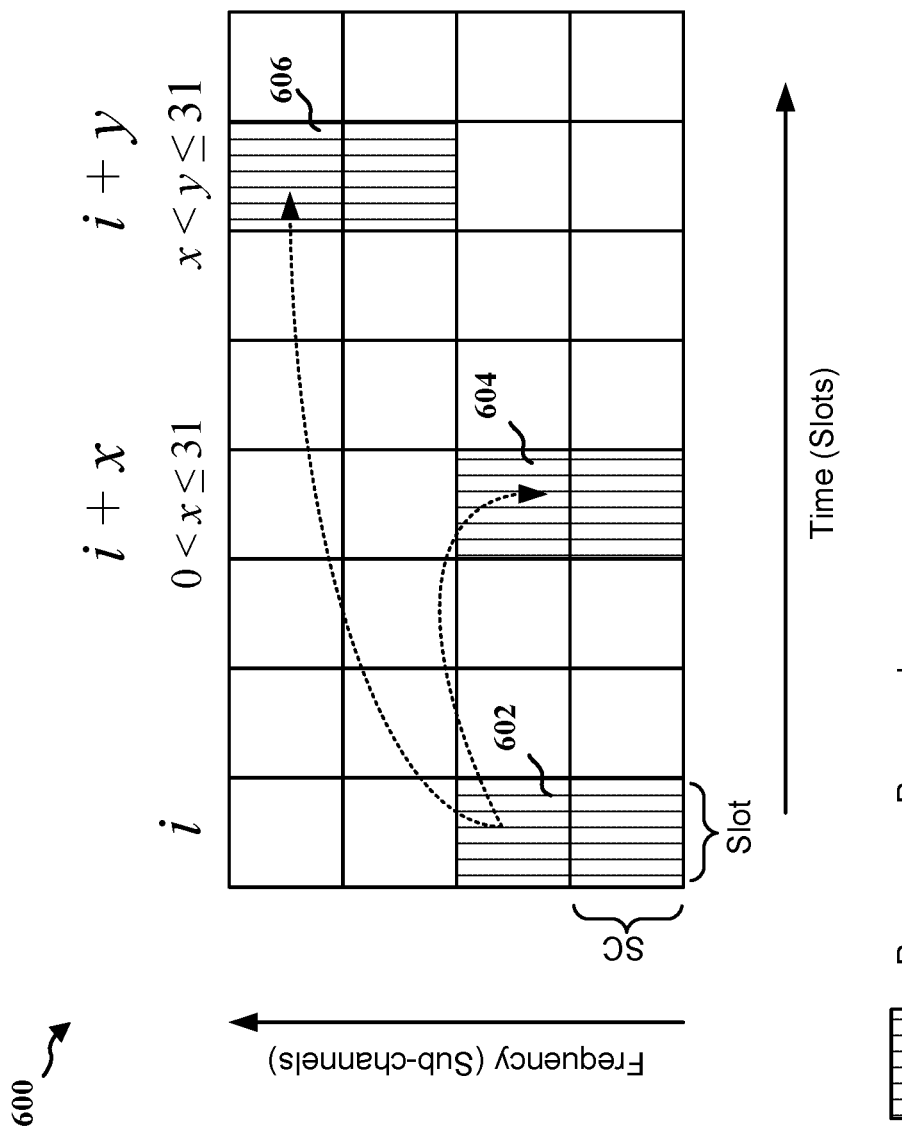
FIG. 6 is a diagram illustrating an example resource reservation.

FIG. 6 is a diagram 600 illustrating an example of a resource reservation. If a UE (e.g., a sidelink transmitting UE) is using a first resource 602 for transmission at slot i in a period (such as period 552 illustrated in FIG. 5), the UE may reserve two more resources within the same period, such as a second resource 604 at slot i+x and a third resource 606 at slot i+y. Each of the reserved resources 602, 604 and 606 may have a number of z sub-channels. For example, if the period has thirty-two (32) slots (e.g., with slot index from #0 to #31), the UE may transmit the first resource 602 at slot 0 with z sub-channels, and the UE may reserve the second resource 604 with z sub-channels at slot i+x where x may be greater than zero (0), and smaller or equal to thirty-one (31) (e.g., 0<x≤31), and the UE may further reserve the third resource 606 with z sub-channels at slot i+y where y may be greater than x, and smaller or equal to thirty-one (31) (e.g., x<y≤31). Table 1 below is an example reservations signaled by the SCI of the UE in slot i corresponding to FIG. 6.

TABLE 1

Reservations signaled by An SCI in Slot i

| Reservation | # Sub-channels | Slot |
|---|---|---|
| 1 | z | i |
| 2 | z | i + x: 0 < x ≤ 31 |
| 3 | z | i + y: x < y ≤ 31 |

The UE may use the second resource 604 and/or the third resource 606 for retransmission of the first resource 602, such as when the transmission of the first resource 602 fails. The UE may also use the second resource 604 and/or the third resource 606 for other purposes other than retransmission.

A transmitting UE using a reserved resource for transmission may request a feedback from one or more receiving UEs or a base station for the transmission. Based on the feedback from the one or more receiving UEs or the base station, the transmitting UE may elect not to use a reserved resource. For example, referring back to FIG. 6, a transmitting UE may use the first resource 602 for a data transmission, and may request a receiving UE or a base station receiving the data transmission to provide a feedback to the transmitting UE. If the transmitting receives a feedback from the receiving UE or the base station confirming the reception/decoding of the data transmission, the transmitting UE may elect not to use the second resources 604 and/or the third resource 606, which may originally be configured or reserved for retransmissions of the data transmission.

A sidelink resource reservation may be periodic or aperiodic. For example, a UE may periodically reserve one or more sidelink resources, such as by indicating a reservation period in a SCI or in one part of the SCI (e.g., in SCI-1 of a two-stage SCI as discussed in details in FIG. 7). Thus, when the periodic resource reservation is enabled for a UE, the reservations in the SCI may be repeated with the signaled period. In some examples, a reservation period for the periodic resource reservation may be configured to values between 0 ms and 1000 ms by signaling in the SCI, and the periodic resource reservation may also be disabled by a (pre-)configuration. In other examples, each resource reservation may be associated with a priority level indicated in the SCI. A resource reservation associated with a higher priority level may pre-empt a resource reservation associated with a lower priority level.

In some examples, a resource reservation may be indicated by a transmitting UE in multiple SCI parts, where the SCI may indicate resources in which the UE is using for a sidelink transmission. For example, a UE may transmit a first part of the reservation in a physical sidelink control channel (PSCCH), and may transmit a second part of the reservation in a physical sidelink shared channel (PSSCH). In other words, a first stage control information (e.g., SCI-1) may be transmitted on a PSCCH and contain resource allocation and information related to the decoding of a second stage control information (e.g., SCI-2), and the second stage control information may be transmitted on a corresponding PSSCH and may contain information for decoding the data (SCH) in the PSSCH. Therefore, multiple resources may be indicated, or reserved, through a combination of the first SCI part indicated in the PSCCH region and the second SCI part in the PSSCH region. For example, the first SCI part in the PSCCH may reserve resources for a UE in a PSSCH, and the first SCI part may also indicate to a receiving UE that there is a second SCI part or more (e.g., Two-stage SCI) in the PSSCH. The second SCI part may reserve other resources or provide signaling and/or information to the UE which may be unrelated to the resources reserved in the first SCI part.

Figure 7:
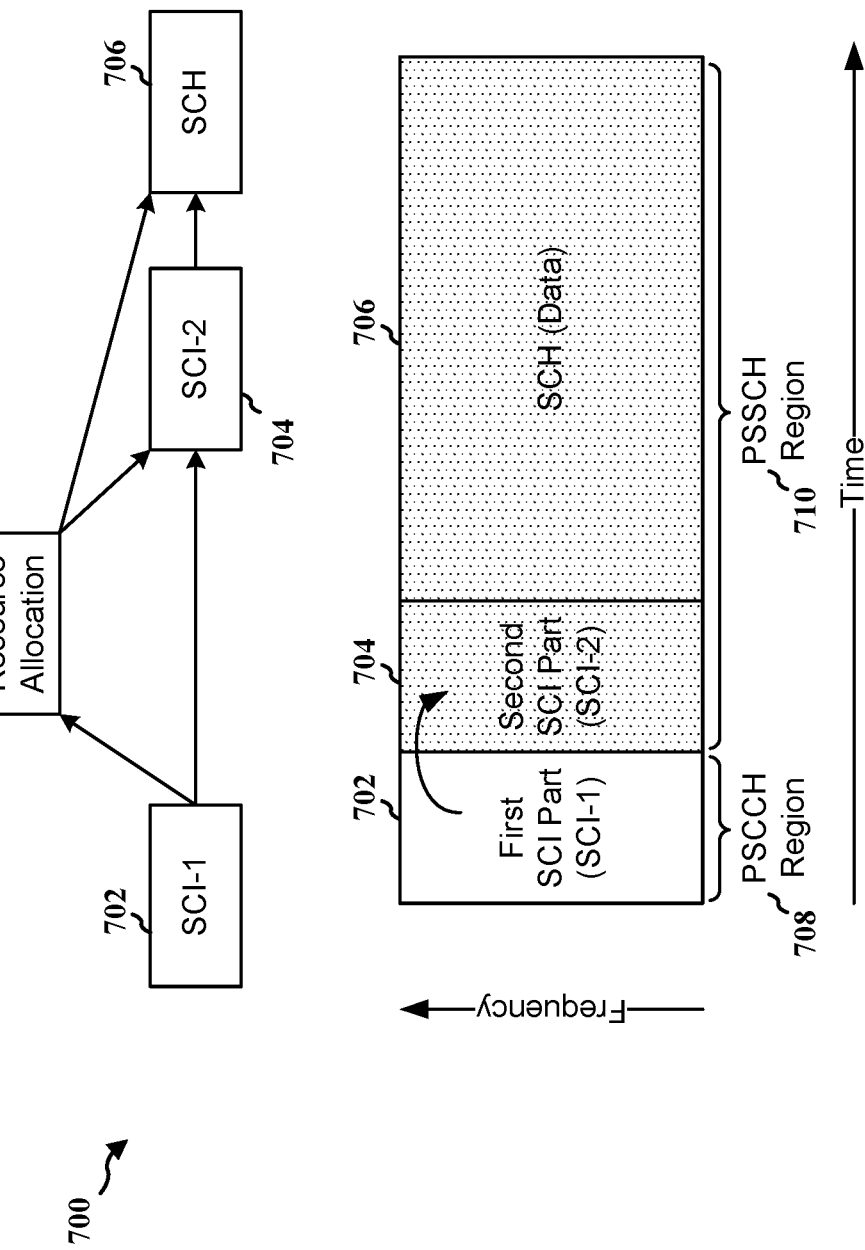
FIG. 7 is a diagram illustrating an example of two-stage PSCCH.

FIG. 7 is a diagram 700 illustrating an example of a two-stage SCI. To reduce control overhead and to improve the processing timeline, SCI used for sidelink grant(s) may split into two parts or more. For example, a first SCI part 702 may be transmitted within the control region (e.g., the PSCCH region 708) and a second SCI part 704 may be transmitted within the downlink traffic region (e.g., the PSSCH region 710). The PSCCH region 708 and the PSSCH region 710 may together form one slot. The first SCI part 702 may include initial control information regarding a sidelink transmission, such as the resource assignment (RA) in SCH 706 or other resource reservation information, rank and modulation order of the sidelink assignment, etc. In addition, the first SCI part 702 may also include control information about the second SCI part 704. In some examples, the control information may indicate the number of resource elements (size) and code rate of the second SCI part 704. The control information may further indicate the location (e.g., starting resource element) and code rate of the second SCI part 704. The second SCI part 704 may include the remaining control information regarding the sidelink assignment. For example, the remaining control information may include non-time critical control information or other resource allocation for data transmission in SCH 706, such as the source and destination ID for the data transmission. In one aspect, a the first SCI part 702 (e.g., SCI-1) format may include one or more of followings: a priority (QoS value), a PSSCH resource assignment (e.g., frequency/time resource for PSSCH), a resource reservation period (e.g., if enabled), a PSSCH DMRS pattern (e.g., if more than one patterns are configured), a second SCI format (e.g. information on the size of the second SCI), a 2-bit beta offset for second stage control resource allocation, number of PSSCH DMRS port(s) (e.g., 1 or 2), a 5-bit MCS and/or reserved bits, etc.

As discussed in connection with FIGS. 5 and 6, a resource allocation mechanism based on sensing and/or partial sensing may be configured to be periodic as periodic resource reservation may enable sidelink transmitting UE(s) to identify and predict the activity of other transmitting UE(s) based on their past activities (e.g., their use of reserved resources, etc.). Thus, the resource allocation mechanism may reduce resource collisions between different transmitting UEs. However, the sensing or partial sensing mechanism may be less effective for aperiodic traffic or aperiodic resource allocation as the activity of other transmitting UEs may be less predictable. In addition, the periodic resource allocation may not be flexible enough to accommodate the aperiodic traffic. For example, as the periodic resource allocation may have a fixed resource allocation in every period, the resource allocation within a resource selection window may be fully reserved by multiple UEs for retransmissions, giving aperiodic traffic less options of available resources within the resource selection window. Further, a transmitting UE may reserve a resource and elect not to use the reserved resource, which may result in a waste of the resource and reduce flexibility for other UEs to reuse the resource.

Aspects presented herein may provide a periodic resource allocation mechanism that enables periodically reserved resources to be used for aperiodic sidelink traffic, which may enable UEs to reserve resources periodically based on sensing or partial sensing technique while providing support for aperiodic traffic. In one aspect, the resource reservation among one or more transmitting UEs may be periodic to enable or facilitate the sensing activity by other transmitting UE(s), such as described in connection with FIG. 5. If a UE elects not to use a reserved resource in a transmission period, the UE may be configured to refrain from transmitting any data (e.g., padding data) in the reserved resources within the transmission period, thereby enabling the UE to adapt the resource reservation based on an instantaneous traffic load. Thus, a sidelink resource may be reserved by UEs in a periodic fashion while still providing flexibility for aperiodic traffic.

In a given period, when a UE does not have any data transmission, the UE may remain idle and not transmit SCI and/or data. For example, the UE may skip transmissions for the given period. While this may enable power saving for the UE, the UE may lose its periodically reserved resources for the sidelink channel (e.g., periodic time and frequency resources) if the UE does not transmit for a certain period. For example, as described in connection with FIGS. 5 and 6, when a transmitting UE reserves a resource for transmission, the UE may reserve additional resources for future transmission. However, when the UE does not transmit (e.g., in a currently reserved slot), the UE may not reserve the additional future slot(s). For example, each periodic resource may indicate the next periodic resource. If the UE does not transmit within a periodic resource, the next periodic resource may not be indicated. Thus, resources within the sidelink channel may be reserved and occupied by other UE(s) and/or base station, and the UE may not be able to reserve any resource in the future if the sidelink channel becomes fully occupied. On the other hand, to maintain periodic resource reservations, the UE may continue to transmit both data (e.g., SCH 606) and control information (e.g., SCI) using the reserved resources, where the data may be padding data (i.e., data with bit paddings). While this may enable the UE to maintain the resource reservation within the channel, it may be a waste of power for the UE and a waste of resources that could potentially be used by other UEs.

Figure 8A:
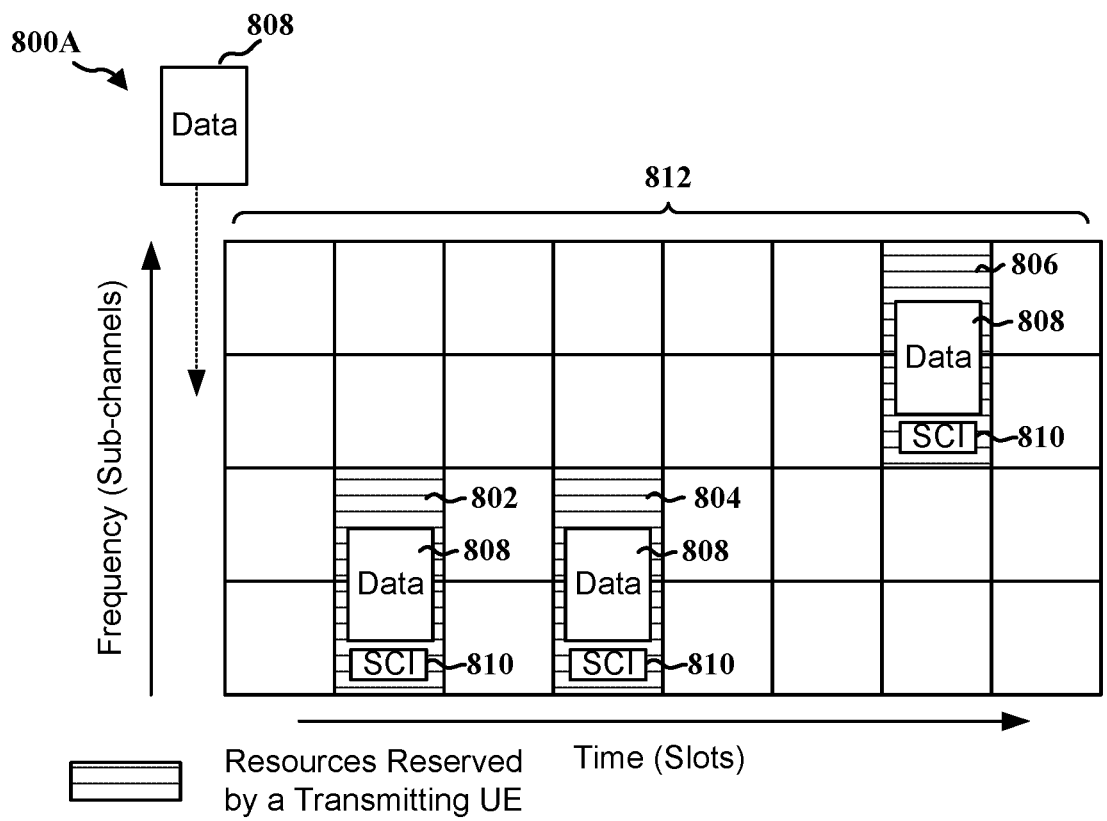
FIGS. 8A and 8B are diagrams illustrating examples of UE using reserved resources.
Figure 8B:
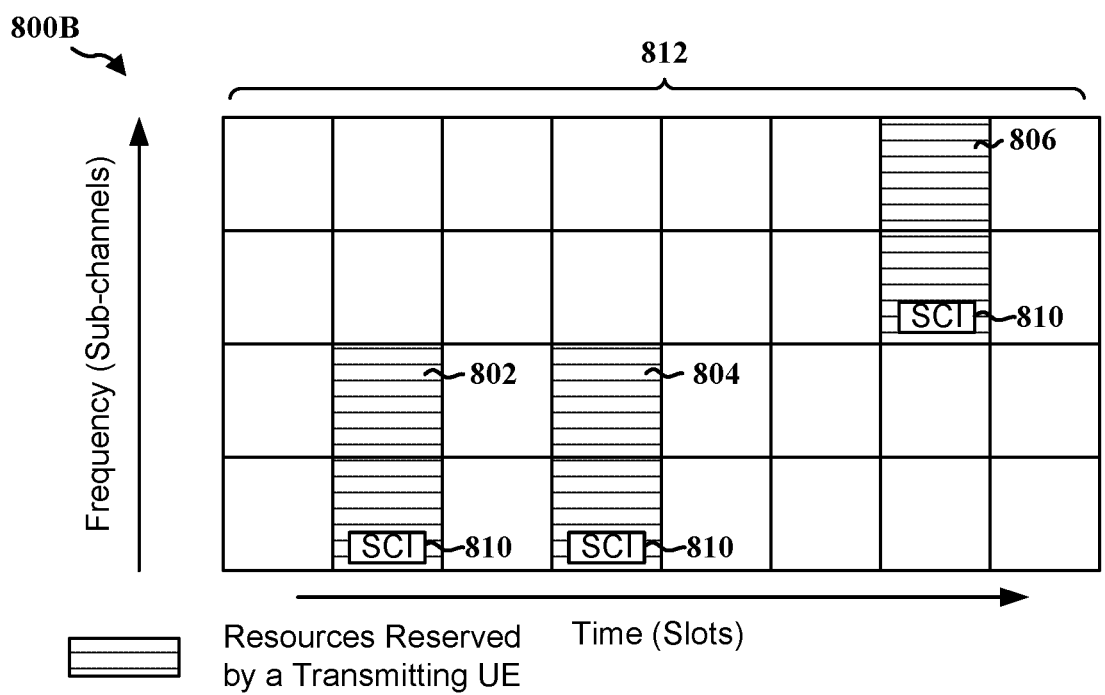

FIGS. 8A and 8B are diagrams 800A and 800B illustrating examples of a UE making and using reserved resources according to aspects of the present disclosure. In one aspect, a transmitting UE may reserve a set of periodic resources within a transmission period, such as described in connection with FIGS. 5 and 6. The transmission period may be based on a periodic resource reservation, such as the period between periodic resources. In some examples, the transmission period may be based on a resource selection window. When sidelink data is ready for transmission by the transmitting UE, e.g., prior to the start of the transmission period, the transmitting UE may use the periodic reserved resources to transmit the data. For example, as shown by FIG. 8A, a transmitting UE may reserve resources 802, 804 and 806 within a transmission period 812 (e.g., resource window). If a data 808 arrives at the transmitting UE before the start of the transmission period 812, the transmitting UE may use the reserved resources 802, 804 and/or 806 to transmit and/or retransmit the data 808 and its corresponding SCI 810. On the other hand, as shown by FIG. 8B, if the transmitting UE determines that there is no data to be transmitted in transmission period 812, the transmitting UE may be configured to transmit SCI 810 in the reserved resources 802, 804 and/or 806 without transmitting data (e.g., without transmitting padding data). The transmission of the SCI without the data may enable the transmitting UE to maintain the resource reservation for future transmissions without occupying the data region (e.g., the PSSCH region 710 in FIG. 7) when there is no data to be transmitted. As the data region (or PSSCH resources) within the reserved resources 802, 804 and 806 is not used by the transmitting UE, the unused resources may be used by other devices, e.g., to serve aperiodic traffic, emergency traffic, etc. The transmission of the SCI without the data may also effectively reduce resource collision between aperiodic traffic and the periodic reserved resource.

While the transmitting UE may choose not to transmit any data in the PSSCH, the transmitting UE may still indicate its PSSCH resource allocation (e.g., via the SCI), such that the transmitting UE may continue to reserve time-domain and/or frequency-domain resources associated with the PSSCH (i.e., data) transmission. In other words, the transmitting may continue to perform PSSCH resource reservation or assignment (e.g., frequency or time resource for PSSCH) as if there is data to be transmitted, but may choose not to transmit any data in the reserved or assigned resource(s). Thus, the transmitting UE may continue to reserve the resources by indicating reserved resources in the SCI on the data channel. As such, other UEs that decodes the SCI (i.e., SCI-1) may still be able to know what time/frequency domain resources are to be reserved/used by the transmitting UE.

In one aspect of the present disclosure, for a transmitting UE to inform other UEs, or other devices such as a base station, that the transmitting UE is not going to transmit any data in one or more reserved resources within a transmission period, such as described in connection with FIG. 8B, the transmitting UE may indicate in SCI whether there is an associated data transmission from the transmitting UE. For example, the transmitting UE may use one or more bits of the SCI or may add or more bits to the SCI (e.g., to the SL_SCH field) to indicate whether there is data associated with its transmission. In another example, the UE may include a single bit in the SCI that indicates whether there is a data transmission associated with the SCI. In such an example, the transmitting UE may indicate zero (0) in the bit indication field of the SCI when there is no associated data transmission. Then, the UE may use the reserved resources to transmit SCI and skip transmission of data. In response, a receiving UE may receive the SCI, determine that there is no accompanying data transmission and skip monitoring for the data or attempting to receive the data, which may conserve the power of the receiving UE. In such an example, the transmitting UE may indicate one (1) in the bit field of the SCI when there is data transmission. Then, the UE may use the reserve resources to transmit both the SCI and the data. A UE receiving the SCI may determine that there is an accompanying data transmission and may determine information for the data transmission and attempt to receive the data transmission.

As described in connection with FIG. 7, the SCI used for sidelink grant(s) may include two parts, where a first SCI part (e.g., SCI-1) may be transmitted within the control region (e.g., PSCCH) and a second SCI part (e.g., SCI-2) may be transmitted within the downlink traffic region (e.g., PSSCH). In one aspect (e.g., Option 1), the indication of whether the transmitting UE is going to send data in the reserved resources of the period may be contained in the SCI-1. The transmitting UE may transmit the SCI-1 in the reserved resources without transmitting data or SCI-2 when there is no data transmission. In another aspect (e.g., Option 2), the indication about whether the transmitting UE is sending any data in the reserved resources may be contained in the SCI-2, and the transmitting UE may transmit both the SCI-1 and the SCI-2 in the reserved resources without transmitting data when there is no data transmission. If a receiving device receives the indication that the transmitting UE is not transmitting data associated with the SCI, such as through the indication in either the SCI-1 or the SCI-2, then the receiving device may skip attempting to decode or monitor the data.

In some examples, transmitting the indication in SCI-2 (e.g., Option 2) may be more suitable for a unicast-service, where the SCI-2 may be directed to one receiving device. As the SCI-2 may contain the source and destination ID, the receiving device may be able to determine whether the SCI-2 is targeted to the receiving device. For example, the transmitting UE may include the indication about whether there is accompanying data along with the source and destination ID in the SCI-2, and the receiving device may look at the destination ID as well as the indication in the SCI-2 to determine whether there is a data transmission intended for the receiving device. If the SCI-2 indicates that there is no data transmission, the receiving device may skip decoding the data or the receiving device does not expect there is any data to be decoded. On the other hand, transmitting the indication about whether there is accompanying data in SCI-1 (e.g., Option 1) may be more suitable or useful for group-cast/broadcast where there is a group of receiving devices that may receive the SCI.

As discussed in connection with FIGS. 5 and 6, a transmitting UE may use one SCI to reserve up to two more resources in the current transmission period (e.g., 504, 506, 510, 512, 604, 606) in addition to the reservation(s) in the next transmission period (e.g., 502, 508, 602 in the next transmission for periodic resource reservation). In one aspect of the present disclosure, if the transmitting UE indicates that there is no data transmission associated with the current SCI, the transmitting UE may not reserve other resources in the current transmission period, such as described in connection with FIG. 8B. For example, the UE may avoid reserving resources in a current transmission period. However, the transmitting UE may still indicate the reservation in the next transmission period, such as by indicating the period in the SCI-1. For example, as shown by diagram 900 in FIG. 9, when a transmitting UE indicates in a current SCI 910 (e.g., SCI-1) for which the UE is not going to transmit any associated data in a current transmission period 912, the transmitting UE may use a resource 902 within the current transmission period 912 to send the SCI 910, but the transmitting UE may not reserve, or may skip reserving, other resources within the current transmission period 912, such as resources 904 and 906, etc. However, the transmitting UE may still make resource reservation for the next transmission period 914, such as a resource 908. As other resources in the same period (e.g., 904, 906) may be used for retransmissions, if there is no data transmission in the current transmission period, the transmitting UE may not have data to retransmit.

In another aspect of the present disclosure, a transmitting UE may be configured to release periodic reservations. For example, if a transmitting UE does not have data to transmit in K consecutive periods, then the transmitting UE may determine to release its reserved resource. The value K may be an integer defined at the transmitting UE or indicated to/configured for the transmitting UE, such as by a base station. If the transmitting UE has data to transmit after releasing its reserved resource, the transmitting UE may select or reserve new resources. For example, if the transmitting UE does not transmit data for a certain period of time, it may be likely that the transmitting UE has finished the transmission and may have no data to transmit. Thus, the transmitting UE may be configured to release its reserved resources. The releasing of periodic resources may enable more resources to be used by other devices.

In one example, after reaching K consecutive periods without data transmission, a transmitting UE may explicitly release the reservation (e.g., the periodic resource reservation). For example, the transmitting UE may indicate the release by setting the reservation period indicated in the SCI-1 to a particular codepoint that is associated with a resource reservation release. For example, there may be an indication field for resource reservation period in SCI-1 which may be used by the transmitting UE to indicate a time in which its next reservation may take place (e.g., 10 ms, 100 ms etc.). If this resource reservation period field in the SCI-1 is enabled, other UE(s) or base station may determine that the transmitting UE has another transmission after the current transmission. The time or period in which the next reserved transmission arrives may be based on the periodicity of the resource reservation. Thus, the transmitting UE may explicitly release its reserved resources by setting resource reservation period field in the SCI-1 to a certain codepoint, such as all zeros, etc. Other UE(s) that receives the SCI-1 from the transmitting UE may determine that the transmitting UE has explicitly released its reserved resources, and may choose to use the released resources.

Figure 11:
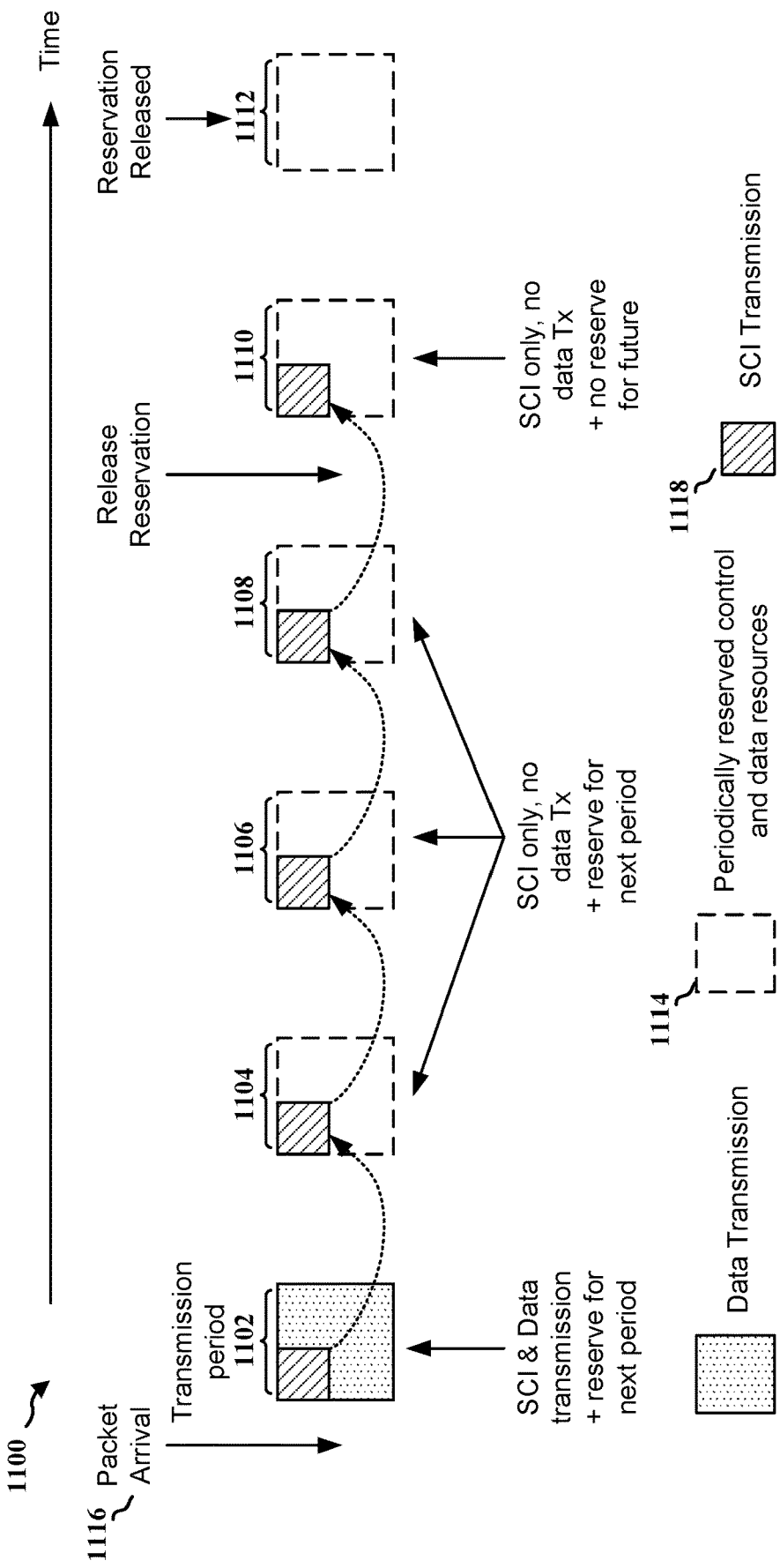
FIG. 11 is a diagram illustrating an example of resource allocation mechanism.

FIG. 11 is a diagram 1100 illustrating an example of a resource allocation mechanism according to some aspects of the present disclosure. A transmitting UE may periodically reserve a plurality of resources 1114 in multiple transmission periods (e.g., 1102, 1104, 1106, 1108, 1110 and 1112 etc.). When a data packet 1116 arrives before the transmission period 1102 or the transmission occasion, the transmitting UE may use the resource 1114 at transmission period 1102 to transmit both the SCI 1118 and the data packet 1116, and the transmitting UE may also use the SCI 1118 transmitted in the transmission period to make resource reservation for next transmission period 1104. At transmission period 1104, if the transmitting UE has no data for transmission, then the transmitting UE may transmit SCI 1118 in transmission period 1104 without transmitting the data. However, the UE may still indicate the resource reservation for the next transmission period 1106 by indicating the periodic resource in the SCI 1118. For example, the transmitting UE may still indicate the reserved resources (i.e., the dashed resources 1114 in FIG. 11) in the SCI (i.e., SCI-1) on the data channel (e.g., PSSCH), but the transmitting UE may not transmit any transmissions on the indicated resources as the transmitting UE's goal of indicating the resources of data transmission is to reserve the resources and may not be for actual data transmission. Thus, other UEs that decodes the SCI (i.e., SCI-1) may still be able to know what time/frequency domain resources are to be reserved by the transmitting UE.

The UE may perform/apply the same action at transmission periods, 1106, 1108, 1110, etc. However, if there is no data transmission after a consecutive number of periods (e.g., 3), the transmitting UE may be configured to release the resource reservation, such as after transmission period 1108. Thus, at transmission period 1110, the UE may still transmit the SCI 1118 which was reserved at the transmission period 1108, but the SCI 1118 in transmission period 1110 may contain an indication (e.g., by setting the period to a particular codepoint) indicating that the transmitting UE has released its reserved resources. The transmitting UE may stop using later instances of the periodic resource reservation, such as at reservation period 1112. If the UE has data to transmit after releasing the periodic resources, the UE may perform a new resource determination and reservation. Based on the codepoint in the SCI, other UEs or a base station may determine that the transmitting UE has released its reserved resources in transmission period 1112, and they may use this resource instead.

As described in connection with FIG. 6, a transmitting UE using a reserved resource for transmission may request feedback from the receiving device. In response, the receiving device may transmit a hybrid automatic repeat request (HARQ)-ACK feedback if the transmission is successfully received and/or may transmit a HARQ-NACK feedback if the transmission fails (e.g., the transmission is not received after a certain period or if the received transmission is unable to be decoded, etc.). In one aspect, when a transmitting UE indicates that there is no data transmission associated with a transmission, the receiving device may still transmit HARQ-ACK feedback to the transmitting UE. For example, in the case of unicast, when an intended receiving UE decodes the transmitting UE's SCI and determines that there is no data transmission associated with the SCI, the receiving UE may still transmit HARQ-ACK feedback, and the HARQ-ACK feedback may indicate whether the SCI is received correctly. This feedback information may be used by the transmitting UE for link adaptation and measurement.

In another aspect, the receiving UE or the base station may skip the HARQ-ACK or NACK feedback for the current transmission period in which the transmitting UE indicates no data transmission is associated with the current transmission period. For example, in the case of group-cast, where there may be a NACK-only transmission, if a receiving UE determines that no data is associated with the transmission, then the receiving UE may not feedback NACK. In other words, if a receiving UE receives the SCI from the transmitting UE in a group-cast, the receiving may not transmit a HARQ-ACK feedback to the transmitting UE. However, if a receiving UE does not receive the SCI from the transmitting UE, the receiving UE may request the transmitting UE to retransmit the SCI by sending a NACK feedback.

The transmitting UE may determine the HARQ-ACK resource using the mapping between the PSCCH and the physical sidelink feedback channel (PSFCH). As shown by diagram 1000 in FIG. 10, the starting sub-channel of a PSSCH (i.e., the data channel) may be used to determine the HARQ-ACK resource (i.e., the PSFCH). Thus, the transmitting UE may receive the HARQ feedback in the PSFCH based on one or more of: a starting sub-channel of a PSCCH in which the SCI is transmitted (e.g., either SCI-1 or SCI if present), a slot including the PSCCH (e.g., either SCI-1 or SCI if present), a source identifier, and/or a destination identifier of the transmission, etc. For example, when there is SCI transmitted without a data transmission is associated with the SCI, the UE may change its dependence on the data channel to the control channel. Thus, the UE may determine the HARQ-ACK feedback resource based on the sub-channel of the PSCCH and the slot index of the PSCCH. In other words, the sub-channel and the slot of the data transmission may be changed to the sub-channel and the slot of the control transmission in order to determine the feedback resource.

Additionally, or optionally, when a receiving UE receives an SCI indicating there is no data transmission from a transmitting UE, the receiving UE may determine whether to send the HARQ-ACK/NACK feedback based on whether the receiving UE receives an associated SCI-2. For example, if the receiving UE does not receive an SCI-2, such as if the SL_SCH field is contained in the SCI-1, the receiving UE may elect not to transmit a HARQ-ACK feedback. On the other hand, if the SL_SCH field is contained in the SCI-2 and received by the receiving UE, the receiving UE may transmit a HARQ-ACK feedback to the transmitting UE.

Figure 12:
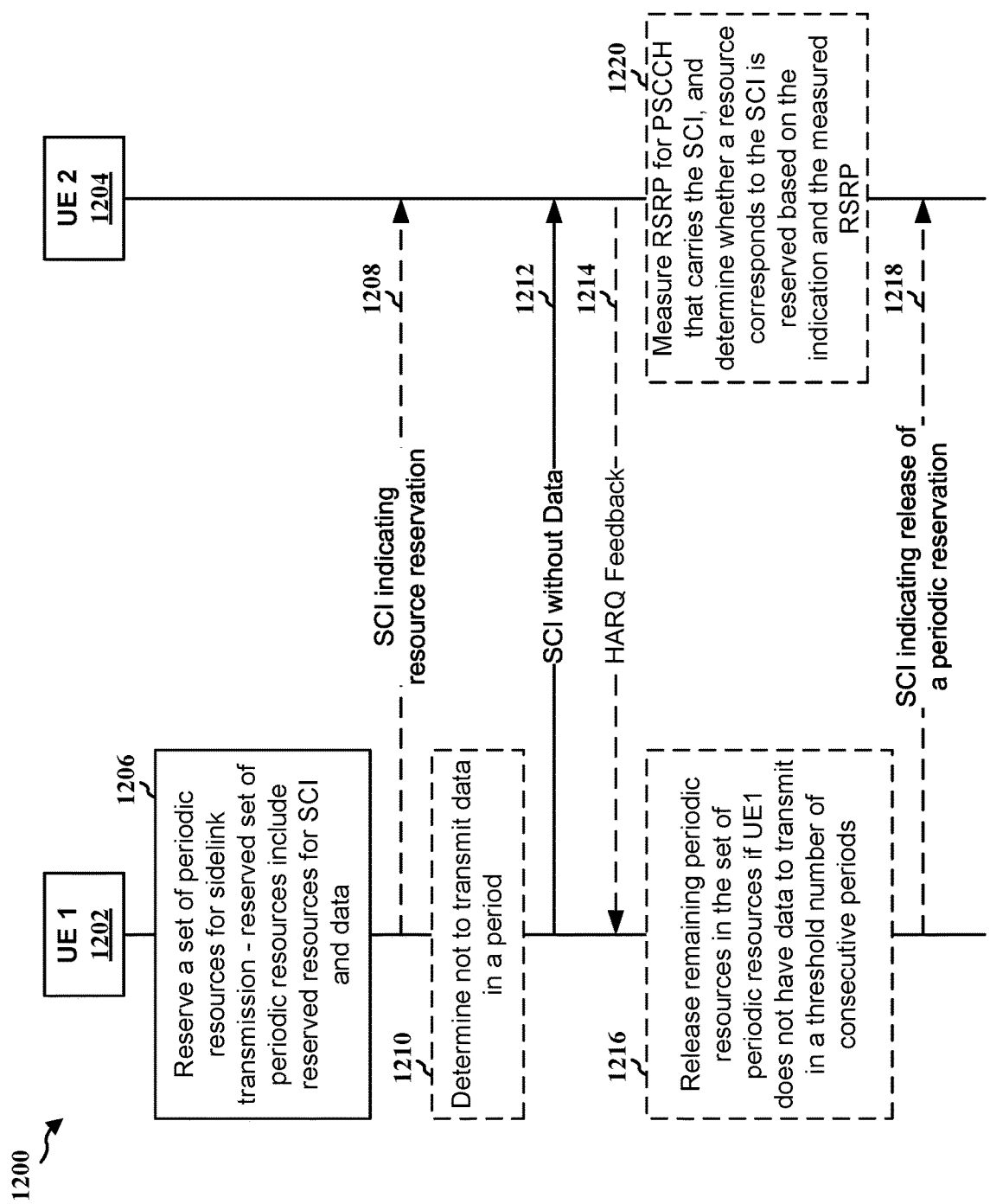
FIG. 12 is a communication flow between two UEs according to aspects of the present disclosure.

FIG. 12 is a communication flow 1200 between a first UE and a second UE according to aspects of the present disclosure. Aspects presented herein may enable a UE to reserve periodic resources based on a sensing or partial sensing, and when the UE elects not to use a reserved resource in a transmission period, the UE may be configured to refrain from transmitting any data in that transmission period, thereby enabling the UE to adapt the resource reservation based on an instantaneous traffic load.

At 1206, a first UE 1202 may reserve a set of periodic resources for sidelink transmission, where the reserved set of periodic resources may include reserved resources for SCI and reserved resources for data, such as described in connection with FIGS. 5 and 6.

At 1208, after the first UE 1202 reserves the set of periodic resources, the first UE 1202 may indicate its reserve resource(s) in SCI, and may transmit the SCI to other UEs, such as a second UE 1204. As such, the second UE 1204 may receive the resource reservation information from the first UE 1202 for the set of periodic resources for sidelink transmission.

At 1210, the first UE 1202 may determine not to transmit data in a period. For example, the first UE 1202 may have completed a data transmission in a previous transmission occasion, and may have no additional data for transmission in the current transmission occasion. As such, the first UE 1202 may determine not to transmit the data in the period based on there being no data for transmission at the first UE 1202 in the period.

Figure 9:
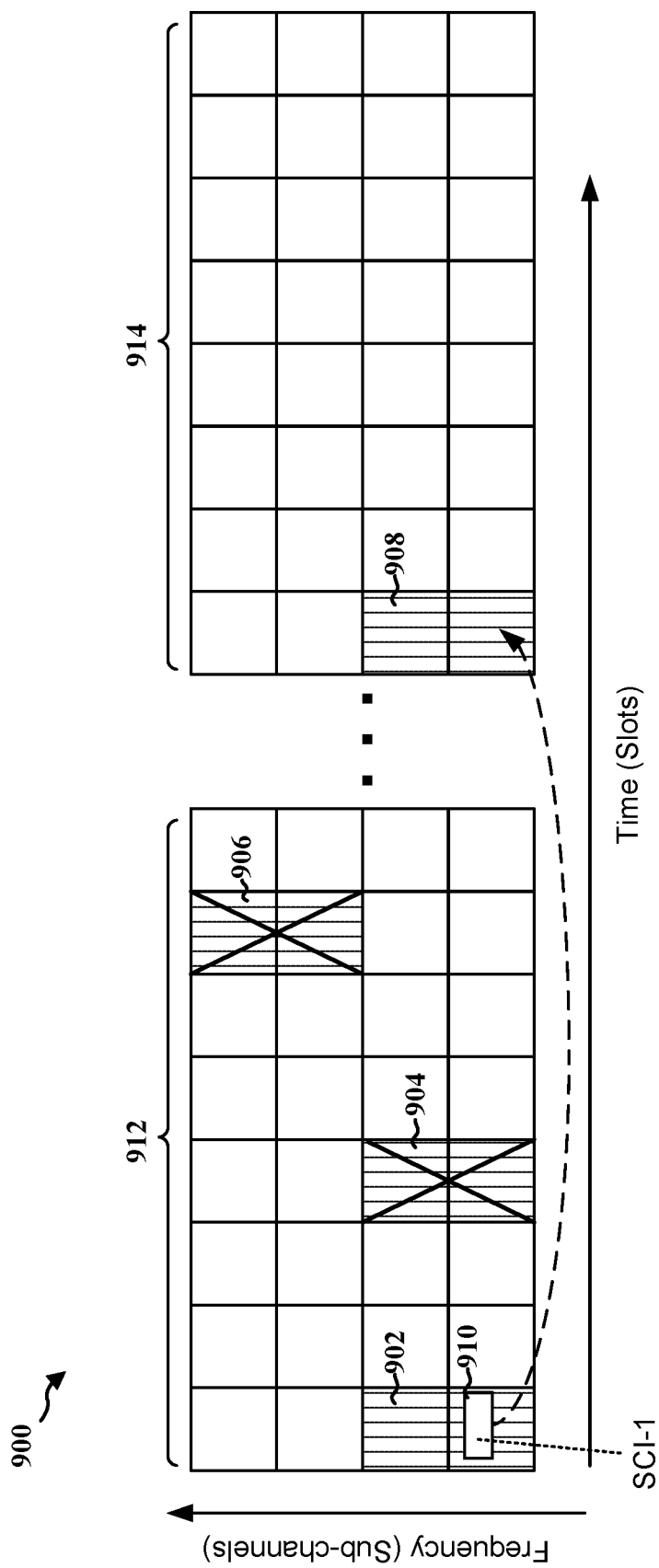
FIG. 9 is a diagram illustrating an example of resource reservation.

At 1212, after determining not to transmit data in a period, the first UE 1202 may transmit, to the second UE 1204, SCI without transmitting data in a periodic resource for the period, such as described in connection with FIGS. 8B, 9 and 11.

In some examples, the SCI may include an indication that the SCI is not associated with a data transmission. In one example, as described in connection with FIG. 7, the indication may be included/transmitted in a first portion of the SCI that is transmitted on a PSCCH (e.g., for a two-stage SCI), and/or may be included/transmitted in a second portion of the SCI that is transmitted on a PSSCH. In another example, as described in connection with FIG. 9, the SCI that is not associated with a data transmission in a period may not reserve resources within the period, but may indicate a periodic reservation in a next period.

At 1214, if the second UE 1204 is configured to transmit a HARQ feedback for the SCI without data, the first UE 1202 may receive a HARQ feedback for the SCI that is transmitted without data (e.g., for the SCI transmitted at 1212). For example, the first UE 1202 may receive (or the second UE 1204 may transmit) the HARQ feedback in a physical sidelink feedback channel (PSFCH) based on a starting sub-channel of a PSCCH in which the SCI is transmitted, a slot including the PSCCH in which the SCI is transmitted, a source identifier, and/or a destination identifier, etc. In another example, the first UE 1202 may receive (or the second UE 1204 may transmit) the HARQ feedback based on the SCI being unicast. In another example, the first UE 1202 may receive (or the second UE 1204 may transmit) the HARQ feedback based on a second part of the SCI being transmitted in a PSSCH.

At 1216, as described in connection with FIG. 11, if the first UE 1202 determines that it does not have data to transmit in a threshold number of consecutive periods, the first UE 1202 may release one or more remaining periodic resources in the set of periodic resources.

At 1218, the first UE 1202 may indicate to the second UE 1204 regarding the releasing of the periodic resource reservation(s). For example, the first UE 1202 may transmit the indication to the second UE 1204 based on a codepoint transmitted in the SCI that corresponds to a release of a periodic reservation. For example, there may be an indication field for resource reservation period in SCI-1 which may be used by the first UE 1202 to indicate a time in which its next reservation may take place (e.g., 10 ms, 100 ms etc.). If this resource reservation period field in the SCI-1 is enabled, the second UE 1204 may determine that the first UE 1202 has another transmission after the current transmission. Thus, the first UE 1202 may explicitly release its reserved resources by setting resource reservation period field in the SCI-1 to a certain codepoint, such as all zeros, etc. In response, the second UE 1204 that receives the SCI-1 from the first UE 1202 may determine that the first UE 1202 has explicitly released its reserved resources, and the second UE 1204 may choose to use the released resources.

In some examples, as shown at 1220, the second UE 1204 may measure RSRP for PSCCH that carries the SCI (e.g., the SCI received at 1212) (e.g., measure the DMRS of the PSCCH that contains the SCI), and the second UE 1204 may determine whether a resource associated with the SCI is reserved based on the indication and the measured RSRP. For example, the second UE 1204 (which may not be communicating with the first UE 1202) may monitor one or more SCIs transmitted by one or more UEs in its proximity (e.g., its reception range), and the second UE 1204 may determine a resource in a next period may be reserved by at least one other UE if the second UE 1204 detects that an SCI contains an indication that the SCI is not associated with a data transmission, and if the measured RSRP for the PSCCH that carries the SCI is above a threshold. For example, when a sensing UE (e.g., a transmitting UE that is transmitting a transmission to a receiving UE) detects an SCI from another (reserving) UE indicating resource reservation, the sensing UE may measure how strong the signal from the reserving UE is, such as based on measuring the RSRP of the channel. This may enable the sensing UE to determine how strong the interference may be experienced by the receiver of the sensing UE (e.g., the receiving UE) if the sensing UE is to transmit a packet in the corresponding resource. Thus, if the measured RSRP is large (e.g., above a threshold), this may indicate that the interference experienced by the receiver of the sensing UE is likely to be large, and hence the sensing UE may determine that this resource may not be used for transmission, and may skip using this resource. On the other hand, if the measured RSRP is small (e.g., below the threshold), this may indicate that the interference experienced by the receiver of the sensing UE is likely to be small, and therefore the sensing UE may determine to transmit using this resource. In other words, in both cases, the resource may be reserved by another UE(s) based on sending SCI. However, if the measured interference is small, the sensing UE may still use that resource for communication (e.g., as if the resource is not reserved). As such, in some examples, the sensing UE may determine whether a resource is available based on measured RSRP (instead of determining whether the resource is reserved or not).

Figure 13:
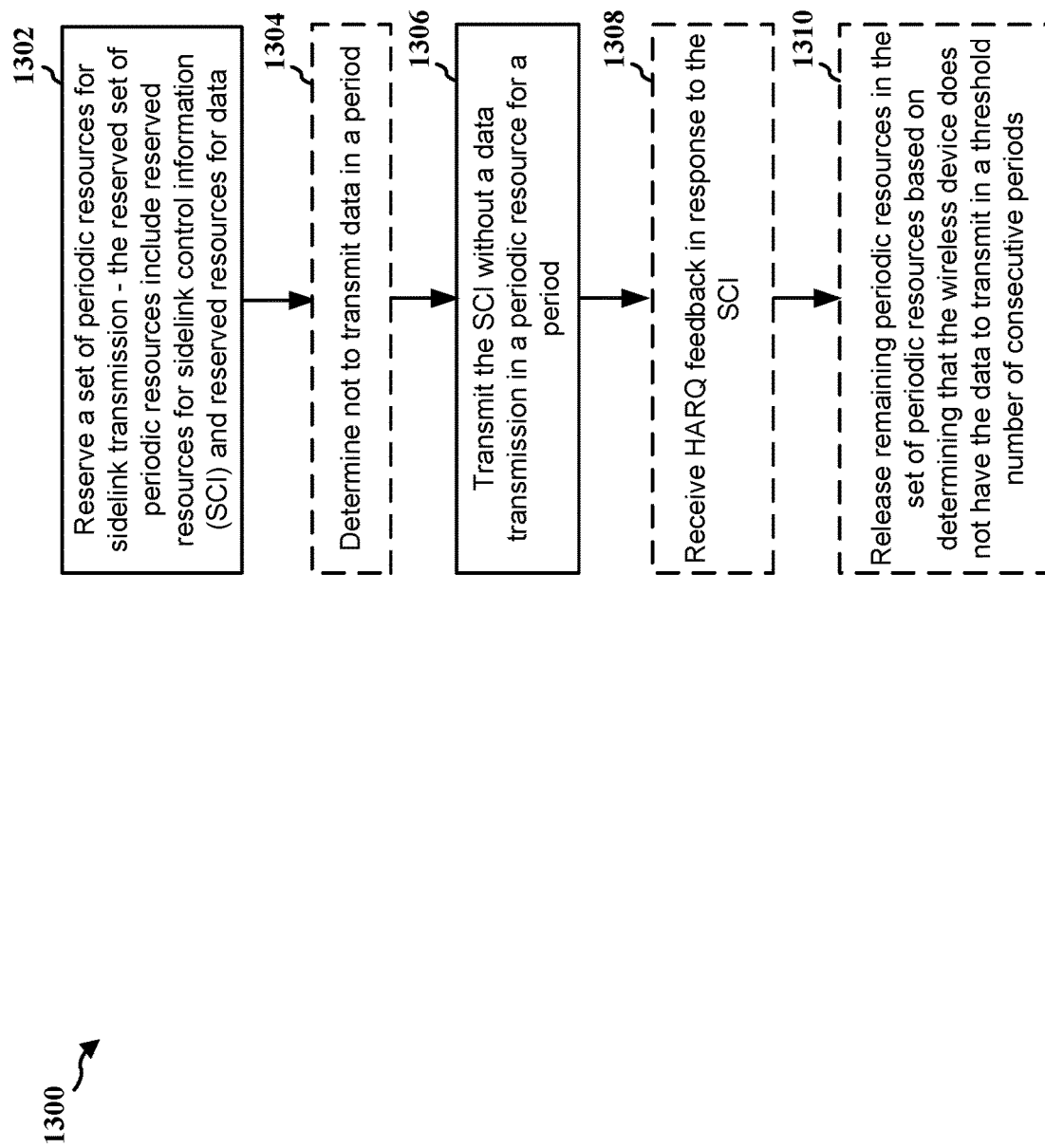
FIG. 13 is a flowchart of a method of wireless communication.

FIG. 13 is a flowchart 1300 of a method of wireless communication. The method may be performed by a wireless device or a component of a wireless device (e.g., a UE 104, 1202; an RSU 107; the device 310 or 350; the apparatus 1402; a processing system, which may include the memory 360 and which may be the device 350 or a component of the device 350, such as the TX processor 368, the RX processor 356, and/or the controller/processor 359). The method may enable the UE to use periodic reserved resources to serve aperiodic traffic. The method may improve the use of wireless resources in sidelink communication.

At 1302, the wireless device may reserve a set of periodic resources for sidelink transmission, where the reserved set of periodic resources may include reserved resources for SCI and reserved resources for data, such as described in connection with FIGS. 5, 6, 11, and 12. For example, at 1206, the first UE 1202 may reserve a set of periodic resources for sidelink transmission that includes reserved resources for SCI and data. The reservation of the set of periodic resources for sidelink transmission may be performed, e.g., by the resource reservation component 1440 of the apparatus 1402 in FIG. 14.

At 1304, the wireless device may determine not to transmit data in a period, such as described in connection with FIGS. 8A, 8B, 9, 11, and 12. For example, at 1210, the first UE 1202 may determine not to transmit data in a period. The determination of not to transmit data may be performed, e.g., by the data transmission determination component 1442 of the apparatus 1402 in FIG. 14. As such, the wireless device may determine not to transmit the data in the period based on there being no data for transmission at the wireless device in the period.

At 1306, the wireless device may transmit the SCI without a data transmission in a periodic resource for a period, such as described in connection with FIGS. 8B, 9, 11, and 12. For example, at 1212, the first UE 1202 may transmit SCI without transmitting data to the second UE 1204. The transmission of the SCI without data may be performed, e.g., by the SCI processing component 1444 and/or the transmission component 1434 of the apparatus 1402 in FIG. 14. In one example, the SCI may include an indication that there is no data transmission associated with the SCI. In such an example, a two-stage SCI may be used, such that the indication may be included in a first portion of the SCI (e.g., SCI-1) that is transmitted on a PSCCH. In another example, the indication may be included in a second portion of the SCI (e.g., SCI-2) that is transmitted on a PSSCH, such as described in connection with FIGS. 7, 8A, 8B, 9, 11, and 12. In another example, when there is no data to transmit within the period, the SCI may not reserve resources within the period and may indicate a periodic reservation in a next period. As such, the wireless device may transmit the SCI without the data transmission in the period based on there being no data for transmission at the wireless device in the period.

Figure 10:
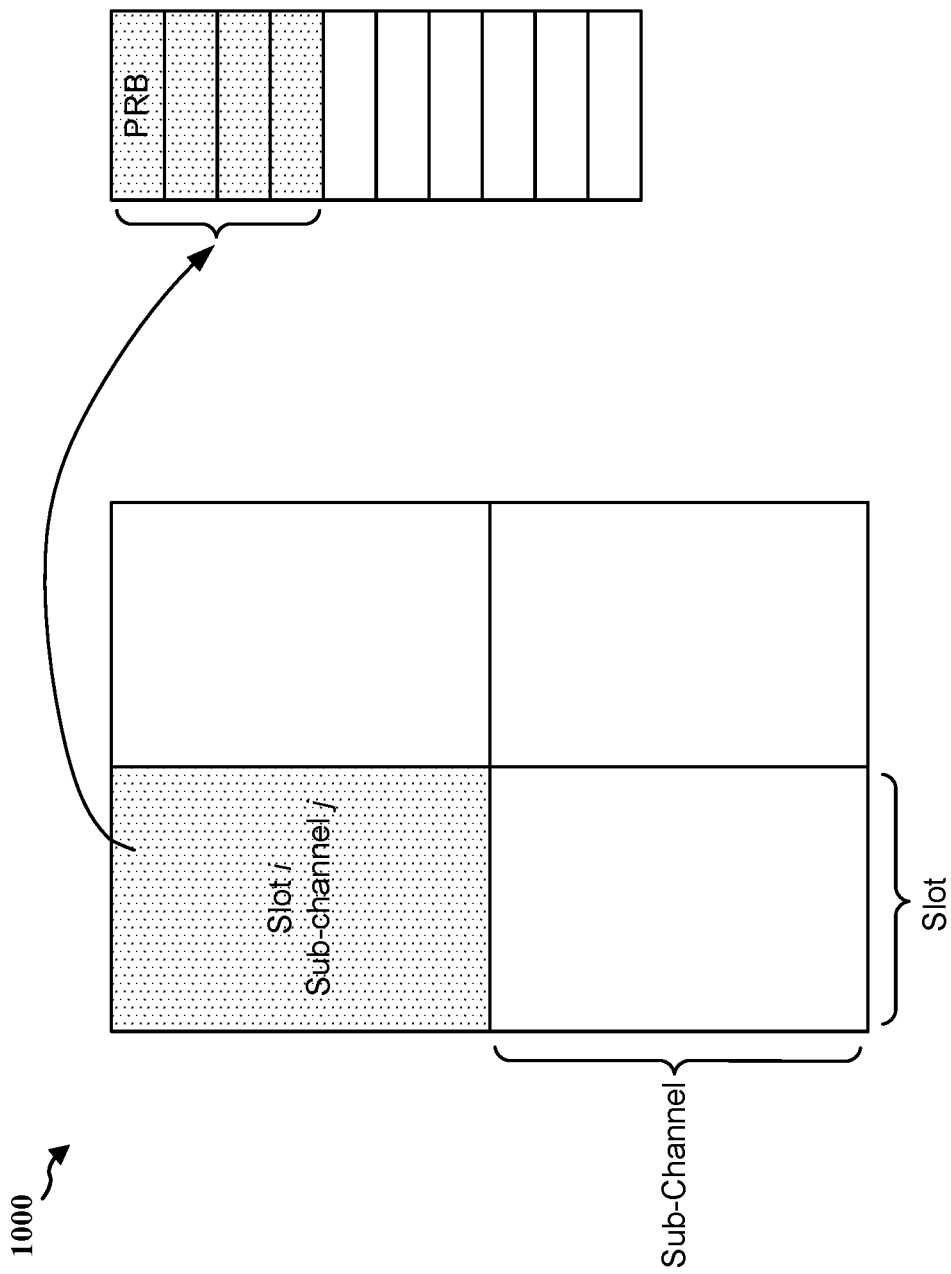
FIG. 10 is a diagram illustrating an example of HARQ-ACK.

At 1308, the wireless device may receive HARQ feedback in response to the SCI, such as described in connection with FIGS. 6, 10, and 12. For example, at 1214, the first UE 1202 may receive a HARQ feedback from the second UE 1204 for the SCI transmitted without data. The reception of the HARQ feedback may be performed, e.g., by the HARQ feedback process component 1446 and/or reception component 1430 of the apparatus 1402 in FIG. 14. In one example, the wireless device may receive the HARQ feedback in a PSFCH based on one or more of: a starting sub-channel of a PSCCH in which the SCI is transmitted, a slot including the PSCCH in which the SCI is transmitted, a source identifier, or a destination identifier. In another example, the wireless device may receive the HARQ feedback based on the SCI being unicast. In another example, the HARQ feedback may be received based on a second part of the SCI being transmitted in a PSSCH, such as described in connection with FIGS. 6 and 10.

At 1310, the wireless device may release remaining periodic resources in the set of periodic resources based on determining that the wireless device does not have the data to transmit in a threshold number of consecutive periods, such as described in connection with FIGS. 11 and 12. For example, at 1216, the first UE 1202 may release remaining periodic resources in the set of periodic resources if the first UE 1202 does not have data to transmit in a threshold number of consecutive periods. The release of the remaining periodic resources may be performed, e.g., by the reserved resource release component 1448 of the apparatus 1402 in FIG. 14. For example, the wireless device may release the remaining periodic resources based on a codepoint transmitted in the SCI that corresponds to a release of a periodic reservation.

Figure 14:
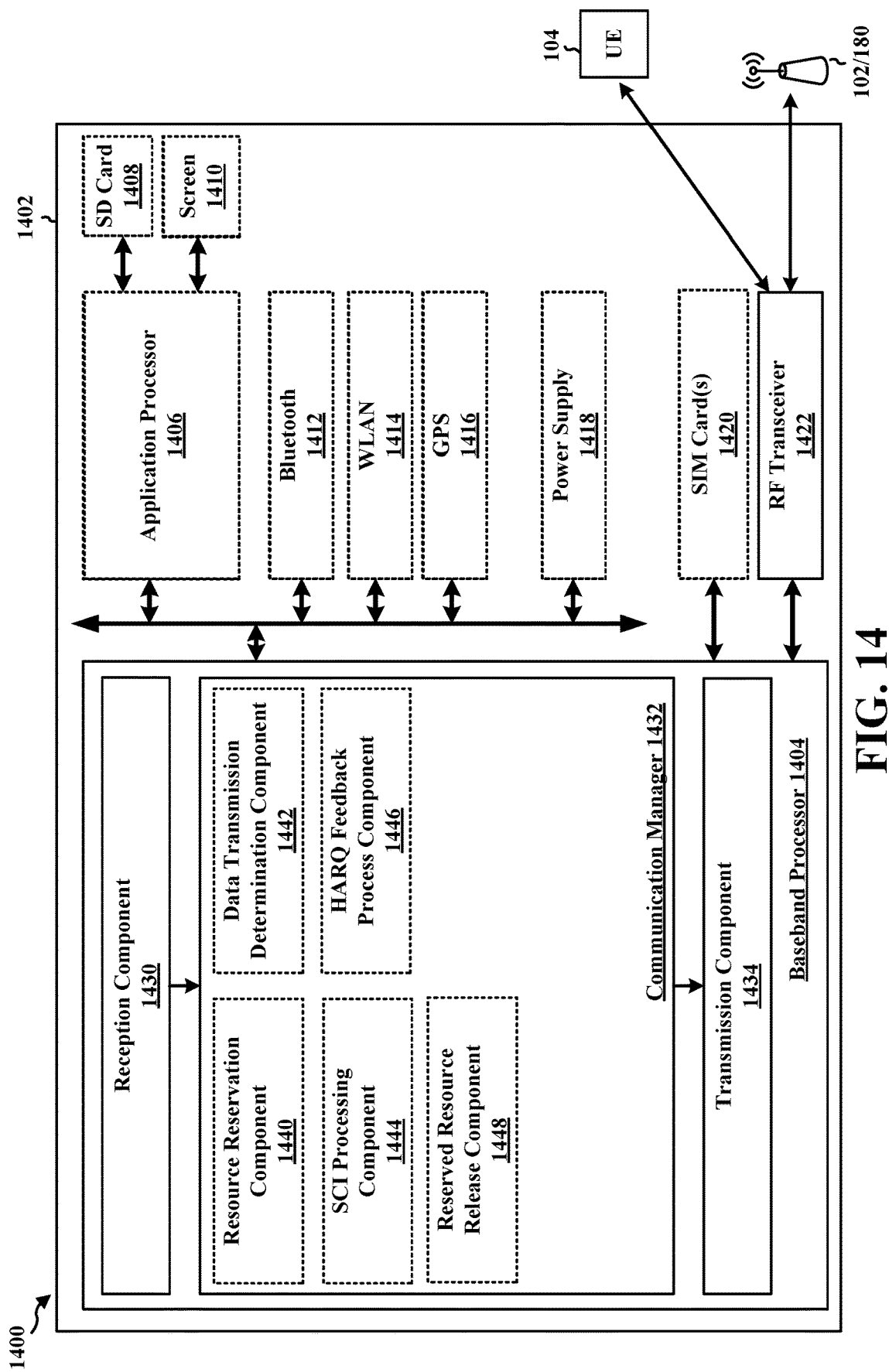
FIG. 14 is a diagram illustrating an example of a hardware implementation for an example apparatus.

FIG. 14 is a diagram 1400 illustrating an example of a hardware implementation for an apparatus 1402. The apparatus 1402 is a wireless device that supports sidelink communication. In some aspects, the apparatus 1402 may be a transmitting UE or a component of a transmitting UE. The apparatus may include a baseband processor 1404 (also referred to as a modem) coupled to an RF transceiver 1422. In some aspects, the baseband processor 1404 may be a cellular baseband processor, and the RF transceiver may be a cellular RF transceiver. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and/or a power supply 1418. The baseband processor 1404 communicates through the RF transceiver 1422 with the wireless device 104 and/or BS 102/180. The baseband processor 1404 may include a computer-readable medium/memory. The baseband processor 1404 is responsible for general processing, including the execution of software stored on the computer-readable medium/memory. The software, when executed by the baseband processor 1404, causes the baseband processor 1404 to perform the various functions described supra. The computer-readable medium/memory may also be used for storing data that is manipulated by the baseband processor 1404 when executing software. The baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband processor 1404. The baseband processor 1404 may be a component of the wireless device 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire wireless device (e.g., see 350 of FIG. 3) and include the additional modules of the apparatus 1402.

The communication manager 1432 includes a resource reservation component 1440 that is configured to reserve a set of periodic resources for sidelink transmission, e.g., as described in connection with 1302 of FIG. 13. The communication manager 1432 further includes a data transmission determination component 1442 that is configured to determine not to transmit data in a period, e.g., as described in connection with 1304 of FIG. 13. The communication manager 1432 further includes an SCI processing component 1444 that is configured to transmit the SCI without a data transmission in a periodic resource for a period, e.g., as described in connection with 1306 of FIG. 13. The communication manager 1432 further includes a HARQ feedback process component 1446 that is configured to receive HARQ feedback in response to the SCI, e.g., as described in connection with 1308 of FIG. 13. The communication manager 1432 further includes a reserved resource release component 1448 that is configured to release remaining periodic resources in the set of periodic resources based on determining that the wireless device does not have the data to transmit in a threshold number of consecutive periods, e.g., as described in connection with 1310 of FIG. 13.

The apparatus may include additional components that perform each of the blocks of the algorithm in the flowcharts of FIG. 13. As such, each block in the flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband processor 1404, includes means for reserving a set of periodic resources for sidelink transmission (e.g., the resource reservation component 1440). The apparatus 1402 includes means for determining not to transmit data in a period (e.g., the data transmission determination component 1442). The apparatus 1402 includes means for transmitting the SCI without a data transmission in a periodic resource for a period (e.g., the SCI processing component 1444 and/or the transmission component 1434). The apparatus 1402 includes means for receiving HARQ feedback in response to the SCI (e.g., the HARQ feedback process component 1446 and/or reception component 1430). The apparatus 1402 includes means for releasing remaining periodic resources in the set of periodic resources based on determining that the wireless device does not have the data to transmit in a threshold number of consecutive periods (e.g., the reserved resource release component 1448).

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
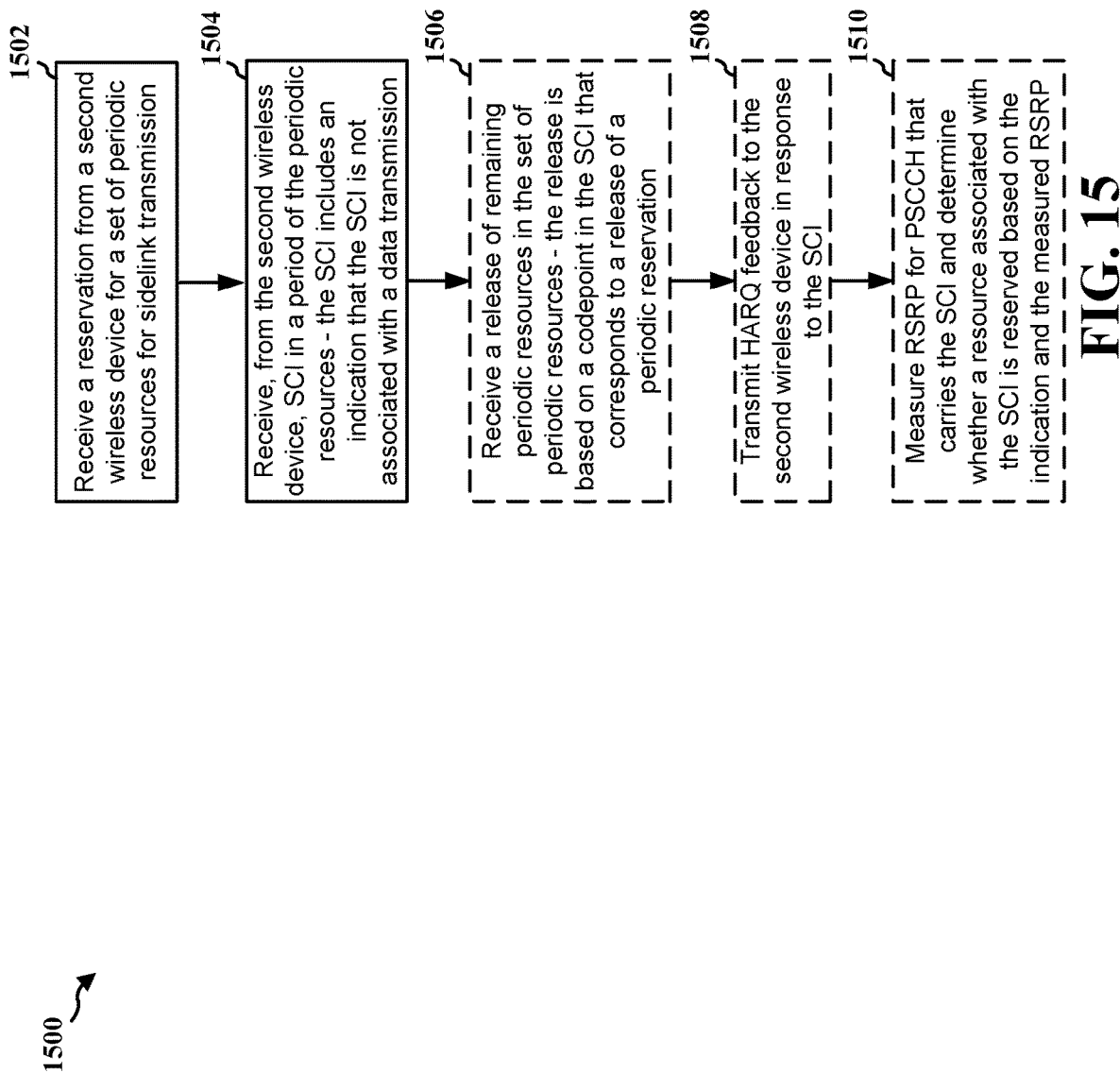
FIG. 15 is a flowchart of a method of wireless communication.

FIG. 15 is a flowchart 1500 of a method of wireless communication. The method may be performed by a first wireless device or a component of a first wireless device (e.g., the UE 104, 1204; an RSU 107; the device 310 or 350; the apparatus 1602; a processing system, which may include the memory 360 and which may be the device 350 or a component of the device 350, such as the TX processor 368, the RX processor 356, and/or the controller/processor 359). The method may enable the first wireless device to monitor receive CSI without data, such that the first wireless device may skip monitoring for data in a sidelink transmission to conserve power. The method may improve the use of wireless resources in sidelink communication.

At 1502, the first wireless device may receive a reservation from a second wireless device for a set of periodic resources for sidelink transmission, such as described in connection with FIGS. 5, 6, and 12. For example, at 1208, the second UE 1204 may receive a reservation from the first UE 1202 for a set of periodic resources for sidelink transmission. The reception of the reservation may be performed, e.g., by the sidelink reservation process component 1640 and/or the reception component 1630 of the apparatus 1602 in FIG. 16.

At 1504, the first wireless device may receive, from the second wireless device, SCI in a period of the periodic resources, the SCI may include an indication that the SCI is not associated with a data transmission, such as described in connection with FIGS. 8A, 8B, 9 and 11. For example, at 1212, the second UE 1204 may receive SCI in a period from the first UE 1202, where the SCI may include an indication that the SCI is not associated with a data transmission. The reception of the SCI may be performed, e.g., by the sidelink transmission process component 1642 and/or the reception component 1630 of the apparatus 1602 in FIG. 16.

In one example, the indication may be included in a first part of the SCI (e.g., SCI-1) that is received in a PSCCH. In such an example, the first wireless device may refrain from attempting to decode a second part of the SCI and the data transmission in response to receiving the indication in the first part of the SCI. In another example, the indication may be included in a second part of the SCI (e.g., SCI-2) that is received in a PSSCH, such as described in connection with FIGS. 7, 8A, 8B, and 11. In such an example, the first wireless device may refrain from attempting to decode the data transmission in response to receiving the indication in the second part of the SCI. In another example, when the SCI indicates it is not associated with the data, the SCI may not reserve resources within the period but may indicate a periodic reservation in a next period.

At 1506, the first wireless device may receive a release of remaining periodic resources in the set of periodic resources, the release being based on a codepoint in the SCI that corresponds to a release of a periodic reservation, such as described in connection with FIG. 11. For example, at 1218, the second UE 1204 may receive a release of remaining periodic resources in the set of periodic resources from the first UE 1202. The reception of the release may be performed, e.g., by the reservation release process component 1644 and/or the reception component 1630 of the apparatus 1602 in FIG. 16.

At 1508, the first wireless device may transmit HARQ feedback to the second wireless device in response to the SCI, such as described in connection with FIGS. 6 and 10. For example, at 1214, the second UE 1204 may transmit HARQ feedback to the first UE 1202 in response to the SCI. The transmission of the HARQ feedback may be performed, e.g., by the HARQ feedback component 1646 and/or the transmission component 1634 of the apparatus 1602 in FIG. 16.

In one example, the HARQ feedback may be transmitted in a PSFCH based on one or more of: a starting sub-channel of the PSCCH in which the SCI is transmitted, a slot including the PSCCH in which the SCI is transmitted, a source identifier, or a destination identifier. In another example, the HARQ feedback may be transmitted based on the SCI being unicast. In another example, the HARQ feedback may be transmitted based on a second part of the SCI being transmitted in a PSSCH.

In other examples, the first wireless device may refrain from transmitting HARQ feedback to the second wireless device in response to the SCI. In one example, the first wireless device may refrain from transmitting the HARQ feedback based on the SCI being group casted or broadcasted. In another example, the first wireless device may refrain from transmitting the HARQ feedback based on the indication being received in a first part of the SCI received in a PSCCH, such as described in connection with FIGS. 6 and 10.

In another example, as shown at 1510, the first wireless device may measure RSRP for PSCCH that carries the SCI (e.g., measure the DMRS of the PSCCH that contains the SCI), and the first wireless device may determine whether a resource associated with the SCI is reserved based on the indication and the measured RSRP. For example, the first wireless device (which may not be communicating with the second UE) may monitor one or more SCIs transmitted by one or more UEs in its proximity (e.g., reception range), and the first wireless device may determine a resource in a next period may be reserved by at least one UE if the first wireless device detects that an SCI contains an indication that the SCI is not associated with a data transmission, and if the measured RSRP for the PSCCH that carries the SCI is above a threshold.

Figure 16:
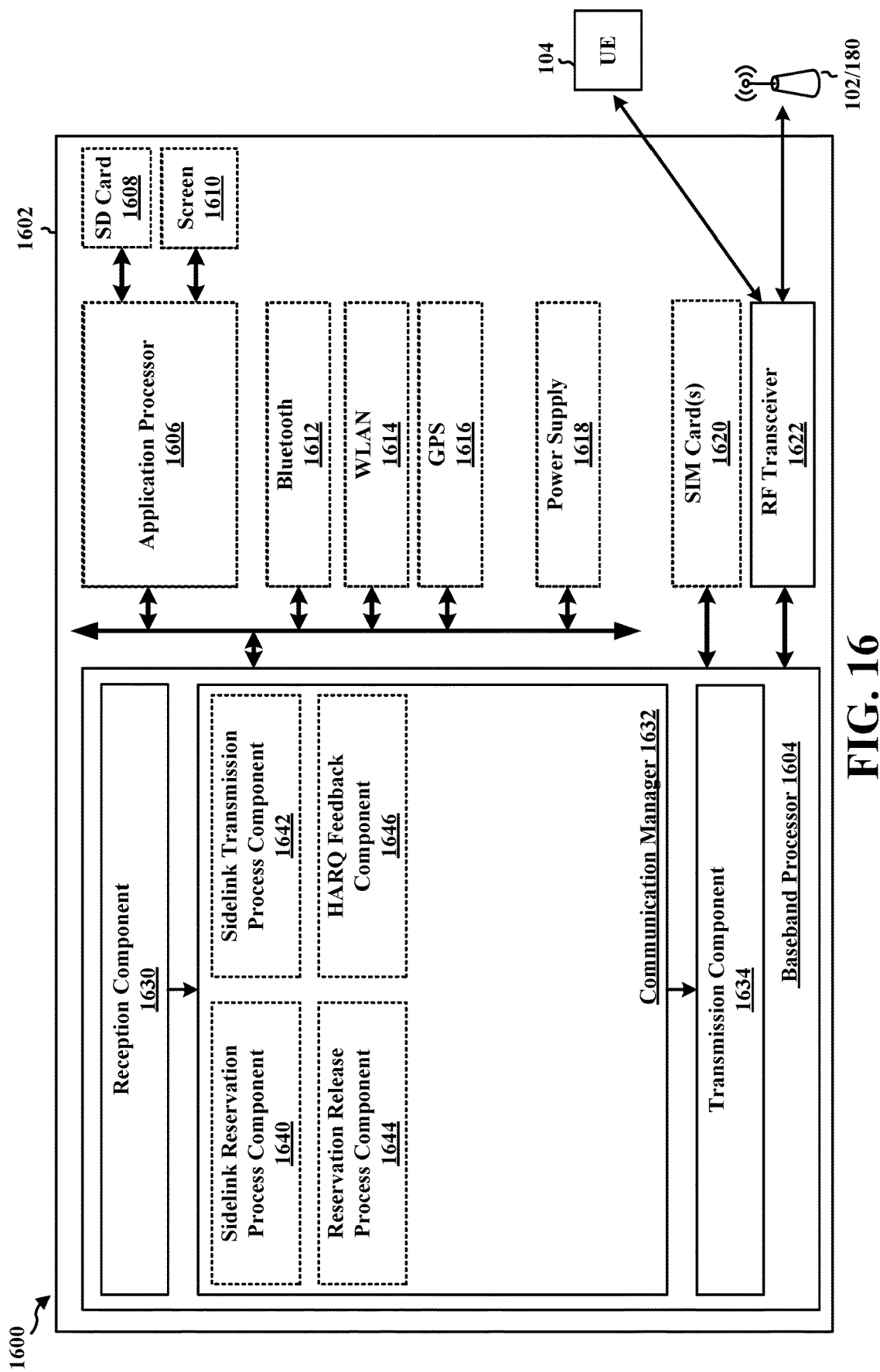
FIG. 16 is a diagram illustrating an example of a hardware implementation for an example apparatus.

FIG. 16 is a diagram 1600 illustrating an example of a hardware implementation for an apparatus 1602. The apparatus 1602 may be a wireless device that supports sidelink communication. In some aspects, the apparatus 1602 may be a UE or a component of a UE. The apparatus may include a baseband processor 1604 (also referred to as a modem) coupled to a RF transceiver 1622. In some aspects, the baseband processor 1604 and the RF transceiver 1622 may be a cellular baseband processor and a cellular RF transceiver. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and/or a power supply 1618. The baseband processor 1604 communicates through the RF transceiver 1622 with the UE 104 and/or BS 102/180. The baseband processor 1604 may include a computer-readable medium/memory. The baseband processor 1604 is responsible for general processing, including the execution of software stored on the computer-readable medium/memory. The software, when executed by the baseband processor 1604, causes the baseband processor 1604 to perform the various functions described supra. The computer-readable medium/memory may also be used for storing data that is manipulated by the baseband processor 1604 when executing software. The baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband processor 1604. The baseband processor 1604 may be a component of the device 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The communication manager 1632 includes a sidelink reservation process component 1640 that is configured to receive a reservation from a second wireless device for a set of periodic resources for sidelink transmission, e.g., as described in connection with 1502 of FIG. 15. The communication manager 1632 further includes a sidelink transmission process component 1642 that is configured to receive, from the second wireless device, SCI in a period of the periodic resources, the SCI including an indication that the SCI is not associated with a data transmission, e.g., as described in connection with 1504 of FIG. 15. The communication manager 1632 further includes a reservation release process component 1644 that is configured to receive a release of remaining periodic resources in the set of periodic resources, the release being based on a codepoint in the SCI that corresponds to a release of a periodic reservation, e.g., as described in connection with 1506 of FIG. 15. The communication manager 1632 further includes a HARQ feedback component 1646 that is configured to transmit HARQ feedback to the second wireless device in response to the SCI, e.g., as described in connection with 1508 of FIG. 15.

The apparatus may include additional components that perform each of the blocks of the algorithm in the flowcharts of FIG. 15. As such, each block in the flowcharts of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband processor 1604, includes means for receiving a reservation from a second wireless device for a set of periodic resources for sidelink transmission (e.g., the sidelink reservation process component 1640 and/or the reception component 1630). The apparatus 1602 includes means for receiving, from the second wireless device, SCI in a period of the periodic resources, the SCI including an indication that the SCI is not associated with a data transmission (e.g., the sidelink transmission process component 1642 and/or the reception component 1630). The apparatus 1602 includes means for receiving a release of remaining periodic resources in the set of periodic resources, the release being based on a codepoint in the SCI that corresponds to a release of a periodic reservation (e.g., the reservation release process component 1644 and/or the reception component 1630). The apparatus 1602 includes means for transmitting HARQ feedback to the second wireless device in response to the SCI (e.g., the HARQ feedback component 1646 and/or the transmission component 1634).

The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

The following examples are illustrative only and may be combined with aspects of other embodiments or teachings described herein, without limitation.

Aspect 1 is a method of wireless communication at a wireless device, including: reserving a set of periodic resources for sidelink transmission, where the reserved set of periodic resources include reserved resources for SCI and reserved resources for data; and transmitting the SCI without a data transmission in a periodic resource for a period.

In aspect 2, the method of aspect 1 further includes that the wireless device transmits the SCI without the data transmission in the period based on there being no data for transmission at the wireless device in the period.

In aspect 3, the method of aspect 1 or aspect 2 further includes that the SCI includes an indication that there is no data transmission associated with the SCI.

In aspect 4, the method of any of aspects 1-3 further includes that the indication is included in a first portion of the SCI that is transmitted on a PSCCH.

In aspect 5, the method of any of aspects 1-4 further includes that the indication is included in a second portion of the SCI that is transmitted on a PSSCH.

In aspect 6, the method of any of aspects 1-5 further includes that the SCI does not reserve resources within the period and indicates a periodic reservation in a next period.

In aspect 7, the method of any of aspects 1-6 further includes: receiving HARQ feedback in response to the SCI.

In aspect 8, the method of any of aspects 1-7 further includes that the HARQ feedback is received in a PSFCH based on one or more of: a starting sub-channel of a PSCCH in which the SCI is transmitted, a slot including the PSCCH in which the SCI is transmitted, a source identifier, or a destination identifier.

In aspect 9, the method of any of aspects 1-8 further includes that the HARQ feedback is received based on the SCI being unicast.

In aspect 10, the method of any of aspects 1-9 further includes that the HARQ feedback is received based on a second part of the SCI being transmitted in a PSSCH.

In aspect 11, the method of any of aspects 1-10 further includes: releasing remaining periodic resources in the set of periodic resources based on determining that the wireless device does not have the data to transmit in a threshold number of consecutive periods.

In aspect 12, the method of any of aspects 1-11 further includes that the wireless device releases the remaining periodic resources based on a codepoint transmitted in the SCI that corresponds to a release of a periodic reservation.

In aspect 13, the method of any of aspects 1-12 further includes: determining not to transmit data in the period.

Aspect 14 is an apparatus for wireless communication including at least one processor coupled to a memory and configured to implement a method as in any of aspects 1 13.

Aspect 15 is an apparatus for wireless communication including means for implementing a method as in any of aspects 1 to 13.

Aspect 16 is a non-transitory computer-readable medium storing computer executable code, where the code when executed by a processor causes the processor to implement a method as in any of aspects 1 to 13.

Aspect 17 is a method of wireless communication at a first wireless device, including: receiving a reservation from a second wireless device for a set of periodic resources for sidelink transmission; and receiving, from the second wireless device, SCI in a period of the periodic resources, the SCI including an indication that the SCI is not associated with a data transmission.

In aspect 18, the method of aspect 17 further includes that the indication is included in a first part of the SCI that is received in a PSCCH.

In aspect 19, the method of aspect 17 or aspect 18 further includes that the first wireless device refrains from attempting to decode a second part of the SCI and the data transmission in response to receiving the indication in the first part of the SCI.

In aspect 20, the method of any of aspects 17-19 further includes that the indication is included in a second part of the SCI that is received in a PSSCH.

In aspect 21, the method of any of aspects 17-20 further includes that the first wireless device refrains from attempting to decode the data transmission in response to receiving the indication in the second part of the SCI.

In aspect 22, the method of any of aspects 17-21 further includes that the SCI does not reserve resources within the period and indicates a periodic reservation in a next period.

In aspect 23, the method of any of aspects 17-22 further includes: receiving a release of remaining periodic resources in the set of periodic resources, the release being based on a codepoint in the SCI that corresponds to a release of a periodic reservation.

In aspect 24, the method of any of aspects 17-23 further includes: transmitting HARQ feedback to the second wireless device in response to the SCI.

In aspect 25, the method of any of aspects 17-24 further includes that the HARQ feedback is transmitted in a PSFCH based on one or more of: a starting sub-channel of the PSCCH in which the SCI is transmitted, a slot including the PSCCH in which the SCI is transmitted, a source identifier, or a destination identifier.

In aspect 26, the method of any of aspects 17-25 further includes that the HARQ feedback is transmitted based on the SCI being unicast.

In aspect 27, the method of any of aspects 17-26 further includes that the HARQ feedback is transmitted based on a second part of the SCI being transmitted in a PSSCH.

In aspect 28, the method of any of aspects 17-27 further includes: refraining from transmitting HARQ feedback to the second wireless device in response to the SCI.

In aspect 29, the method of any of aspects 17-28 further includes that the first wireless device refrains from transmitting the HARQ feedback based on the SCI being group casted or broadcasted.

In aspect 30, the method of any of aspects 17-29 further includes that the first wireless device refrains from transmitting the HARQ feedback based on the indication being received in a first part of the SCI received in a PSCCH.

In aspect 31, the method of any of aspects 17-30 further includes: measuring RSRP for PSCCH that carries the SCI; and determining whether a resource associated with the SCI is reserved based on the indication and the measured RSRP.

Aspect 32 is an apparatus for wireless communication including at least one processor coupled to a memory and configured to implement a method as in any of aspects 17 to 31.

Aspect 33 is an apparatus for wireless communication including means for implementing a method as in any of aspects 17 to 31.

Aspect 34 is a non-transitory computer-readable medium storing computer executable code, where the code when executed by a processor causes the processor to implement a method as in any of aspects 17 to 31.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a wireless device, comprising:
   a memory; and
   at least one processor coupled to the memory and configured to:
      reserve a set of periodic resources for sidelink transmission, wherein the reserved set of periodic resources include reserved resources for sidelink control information (SCI) and reserved resources for data; and
      transmit the SCI without a data transmission in a periodic resource for a period, wherein the SCI includes an indication that there is no data transmission associated with the SCI, wherein the indication is comprised in a first portion of the SCI that is transmitted on a physical sidelink control channel (PSCCH).

2. The apparatus of claim 1, wherein the wireless device transmits the SCI without the data transmission in the period based on there being no data for transmission at the wireless device in the period.

3. The apparatus of claim 1, wherein the indication is further comprised in a second portion of the SCI that is transmitted on a physical sidelink shared channel (PSSCH).

4. The apparatus of claim 1, wherein the SCI does not reserve resources within the period and indicates a periodic reservation in a next period.

5. The apparatus of claim 1, wherein the at least one processor is further configured to:
receive hybrid automatic repeat request (HARQ) feedback in response to the SCI.

6. The apparatus of claim 5, wherein the HARQ feedback is received in a physical sidelink feedback channel (PSFCH) based on one or more of:
a starting sub-channel of the PSCCH in which the SCI is transmitted,
a slot comprising the PSCCH in which the SCI is transmitted,
a source identifier, or
a destination identifier.

7. The apparatus of claim 5, wherein the HARQ feedback is based on the SCI being unicast.

8. The apparatus of claim 5, wherein the HARQ feedback is based on a second part of the SCI being transmitted in a physical sidelink shared channel (PSSCH).

9. The apparatus of claim 1, wherein the at least one processor is further configured to:
release remaining periodic resources in the set of periodic resources min response to the wireless device not having the data to transmit in a threshold number of consecutive periods.

10. The apparatus of claim 9, wherein the wireless device releases the remaining periodic resources based on a codepoint transmitted in the SCI that corresponds to a release of a periodic reservation.

11. A method of wireless communication at a wireless device, comprising:
reserving a set of periodic resources for sidelink transmission, wherein the reserved set of periodic resources include reserved resources for sidelink control information (SCI) and reserved resources for data; and
transmitting the SCI without a data transmission in a periodic resource for a period, wherein the SCI includes an indication that there is no data transmission associated with the SCI, wherein the indication is comprised in a first portion of the SCI that is transmitted on a physical sidelink control channel (PSCCH).

12. The method of claim 11, wherein the wireless device transmits the SCI without transmitting the data transmission in the period based on there being no data for transmission at the wireless device in the period.

13. The method of claim 11, wherein the indication is further comprised in a second portion of the SCI that is transmitted on a physical sidelink shared channel (PSSCH).

14. The method of claim 11, wherein the SCI does not reserve resources within the period and indicates a periodic reservation in a next period.

15. The method of claim 11, further comprising:
receiving hybrid automatic repeat request (HARQ) feedback in response to the SCI.

16. The method of claim 15, wherein the HARQ feedback is received in a physical sidelink feedback channel (PSFCH) based on one or more of:
a starting sub-channel of the PSCCH in which the SCI is transmitted,
a slot comprising the PSCCH in which the SCI is transmitted,
a source identifier, or
a destination identifier.

17. The method of claim 15, wherein the HARQ feedback is received based on the SCI being unicast.

18. The method of claim 15, wherein the HARQ feedback is received based on a second part of the SCI being transmitted in a physical sidelink shared channel (PSSCH).

19. The method of claim 11, further comprising:
releasing remaining periodic resources in the set of periodic resources based on determining that the wireless device does not have the data to transmit in a threshold number of consecutive periods.

20. An apparatus for wireless communication at a first wireless device, comprising:
a memory; and
at least one processor coupled to the memory and configured to:
receive a reservation from a second wireless device for a set of periodic resources for sidelink transmission;
receive, from the second wireless device, sidelink control information (SCI) in a period of the set of periodic resources, the SCI including an indication that the SCI is not associated with a data transmission, wherein the indication is comprised in a first part of the SCI in a physical sidelink control channel (PSCCH); and
refrain from attempting to decode a second part of the SCI and the data transmission in response to receiving the indication in the first part of the SCI.

21. The apparatus of claim 20, wherein the at least one processor is further configured to:
measure reference signal received power (RSRP) for the PSCCH that carries the SCI; and
determine whether a resource associated with the SCI is reserved based on the indication and the measured RSRP.

22. The apparatus of claim 20, wherein the SCI does not reserve resources within the period and indicates a periodic reservation in a next period.

23. The apparatus of claim 20, wherein the at least one processor is further configured to:
receive a release of remaining periodic resources in the set of periodic resources, the release being based on a codepoint in the SCI that corresponds to periodic reservation release.

24. The apparatus of claim 20, wherein the at least one processor is further configured to:
transmit hybrid automatic repeat request (HARQ) feedback to the second wireless device in response to the SCI.

25. A method of wireless communication at a first wireless device, comprising:
receiving a reservation from a second wireless device for a set of periodic resources for sidelink transmission;
receiving, from the second wireless device, sidelink control information (SCI) in a period of the set of periodic resources, the SCI including an indication that the SCI is not associated with a data transmission, wherein the indication is comprised in a first part of the SCI in a physical sidelink control channel (PSCCH); and
refraining from attempting to decode a second part of the SCI and the data transmission in response to receiving the indication in the first part of the SCI.

26. The method of claim 25, further comprising:
measuring reference signal received power (RSRP) for the PSCCH that carries the SCI; and
determining whether a resource associated with the SCI is reserved based on the indication and the measured RSRP.

27. The method of claim 25, wherein the SCI does not reserve resources within the period and indicates a periodic reservation in a next period.

28. The method of claim 25, further comprising:
receiving a release of remaining periodic resources in the set of periodic resources, the release being based on a codepoint in the SCI that corresponds to periodic reservation release.

29. The method of claim 25, further comprising:
transmitting hybrid automatic repeat request (HARQ) feedback to the second wireless device in response to the SCI.

* * * * *